US011967931B2

(12) United States Patent
Rousseau et al.

(10) Patent No.: US 11,967,931 B2
(45) Date of Patent: Apr. 23, 2024

(54) METHOD FOR TESTING COMPATIBILITY

(71) Applicant: SOMFY ACTIVITES SA, Cluses (FR)

(72) Inventors: Fabien Rousseau, Mieussy (FR); Yves-Marie Saint-Drenan, Mougins (FR)

(73) Assignee: SOMFY ACTIVITES SA, Cluses (FR)

(*) Notice: Subject to any disclaimer, the term of this patent is extended or adjusted under 35 U.S.C. 154(b) by 0 days.

(21) Appl. No.: 16/634,708

(22) PCT Filed: Jul. 30, 2018

(86) PCT No.: PCT/EP2018/070638
§ 371 (c)(1),
(2) Date: Jan. 28, 2020

(87) PCT Pub. No.: WO2019/025389
PCT Pub. Date: Feb. 7, 2019

(65) Prior Publication Data
US 2020/0212842 A1 Jul. 2, 2020

(30) Foreign Application Priority Data

Jul. 31, 2017 (FR) .................................. 1757335

(51) Int. Cl.
*H02S 50/10* (2014.01)
(52) U.S. Cl.
CPC .................... *H02S 50/10* (2014.12)
(58) Field of Classification Search
None
See application file for complete search history.

(56) References Cited

U.S. PATENT DOCUMENTS

2006/0137736 A1* 6/2006 Nishitani ............... G06Q 10/04
136/251
2006/0213386 A1 9/2006 Funakura
(Continued)

FOREIGN PATENT DOCUMENTS

AU 2015101789 A4 1/2016
CN 1664516 A 9/2005
(Continued)

OTHER PUBLICATIONS

Espacenet machine translation, Benferhat et al., WO2008047215A1 Method of Controlling the Movement of a Mobile Screen of an Autonomous Home-Automation Device, Apr. 24, 2008 (Year: 2008).*
(Continued)

*Primary Examiner* — Michael J Dalbo
*Assistant Examiner* — Denise R Karavias
(74) *Attorney, Agent, or Firm* — Seckel IP, PLLC

(57) ABSTRACT

A method for testing compatibility between the energy needs of an electrically autonomous home-automation device and a predetermined location for a photovoltaic module comprising a step (Etp1) of selecting and storing an electrically autonomous home-automation device, a step (Etp2) of inputting and storing position data relative to the predetermined location, a step (Etp3) of defining and storing a shadow mask, a step (Etp5) of calculating the change in the amplitude of the solar radiation received at the predetermined location over the course of a year and a step (Etp6) of calculating an energy balance from the change in the amplitude of the solar radiation received at the predetermined location and the energy needs of the selected home-automation device.

23 Claims, 6 Drawing Sheets

(56) References Cited

U.S. PATENT DOCUMENTS

| | | | |
|---|---|---|---|
| 2007/0150198 A1* | 6/2007 | MacDonald | G01W 1/12 702/2 |
| 2007/0214665 A1 | 9/2007 | Courter | |
| 2009/0257650 A1 | 10/2009 | Lim et al. | |
| 2010/0061593 A1 | 3/2010 | MacDonald et al. | |
| 2010/0154999 A1* | 6/2010 | Oh | E06B 9/322 160/7 |
| 2010/0182774 A1* | 7/2010 | Kugel | H02J 7/0048 362/183 |
| 2010/0302363 A1 | 12/2010 | Mackenzie | |
| 2011/0265956 A1* | 11/2011 | Cavarec | E06B 9/40 160/1 |
| 2012/0035887 A1* | 2/2012 | Augenbraun | G06T 15/50 703/1 |
| 2012/0098669 A1* | 4/2012 | Lockwood | H05B 47/16 340/657 |
| 2013/0314699 A1 | 11/2013 | Jungerman et al. | |
| 2014/0145511 A1* | 5/2014 | Renzi | E06B 9/11 307/84 |
| 2014/0176543 A1 | 6/2014 | MacDonald et al. | |
| 2015/0331972 A1* | 11/2015 | McClure | G06F 17/11 703/2 |
| 2016/0140283 A1* | 5/2016 | Morse | G06F 30/20 716/135 |
| 2017/0075183 A1 | 3/2017 | Brown | |
| 2017/0116460 A1 | 4/2017 | Jungerman et al. | |
| 2020/0057346 A1 | 2/2020 | Zedlitz et al. | |
| 2020/0096387 A1 | 3/2020 | Koulomzin | |
| 2020/0098170 A1 | 3/2020 | Sehgal et al. | |
| 2020/0212842 A1 | 7/2020 | Rousseau et al. | |

FOREIGN PATENT DOCUMENTS

| | | |
|---|---|---|
| CN | 103765726 A | 4/2014 |
| EP | 1705614 A2 | 9/2006 |
| EP | 2085901 A1 | 8/2009 |
| EP | 2199528 A2 | 6/2010 |
| FR | 2966942 A1 | 5/2012 |
| FR | 3016002 A1 | 7/2015 |
| JP | H11-69658 A | 3/1999 |
| JP | 2002-351942 A | 12/2002 |
| WO | 2019025389 A1 | 2/2019 |

OTHER PUBLICATIONS

Espacenet machine translation, Cavarec et al., WO2015101614A1 Method for Operating a Window of a Building, Jul. 9, 2015 (Year: 2015).*

Renier Paolo, Shading, downloaded from https://web.archive.org/web/20160814104605/http://www.renieriarchitetto.com/riqualificazione-energetica/en/services/buildings-physics/shadow-analysis.html, downloaded on May 30, 2021 (Year: 2016).*

Espacenet machine translation, WO2008047215A1, Benferhat et al., "Method of Controlling the Movement of a Mobile Screen of an Autonomous Home-Automation Device," Apr. 24, 2008 (Year: 2008).*

Cameron Windham, "Shadows and Angles Measuring Object Heights from Satellite Imagery," Spatial Analysis, GIS Lounge, Feb. 4, 2014, downloaded from https://www.gislounge.com/shadows-angles-measuring-object-heights-satellite-imagery/ on Dec. 13, 2021 (Year: 2014).*

Encyclopaedia Britannica, "Angle of Incidence and Angle of Reflection," 2006, downloaded from https://www.britannica.com/science/refraction#/media/1/24799/91333, downloaded on Dec. 17, 2021 (Year: 2006).*

Graber, Motorized Blinds & Shades, United States Price List, May 2016, downloaded from Graber-Motorization-Price-List-May2016.pdf (escnj.us) on Oct. 27, 2022 (Year: 2016).*

International Search Report and Written Opinion dated Oct. 11, 2018 in counterpart application No. PCT/EP2018/070638; w/ English machine translation (total 27 pages).

"Shadow analysis—Architetto Paolo Renieri", https://web.archive.org/web/20160814104605/https://www.renieriarchitetto.com/riqualificazione-energetica/en/services/buildings-physics/shadow-analysis.html; retrieved Apr. 20, 2018 (5 pages) (in English; cited in the ISR).

Japanese Office Action dated Apr. 12, 2022 in counterpart application No. JP2020-506218; w/ English machine translation (total 9 pages) (note: US20140145511, D2 cited in the Japanese Office Action, is not listed in this IDS since it was already listed in the IDS filed Jan. 28, 2020).

Notice of Allowance dated Oct. 3, 2023 in co-pending U.S. Appl. No. 17/440,888; with PTO892; without returned SB08 (total 10 pages) (note: ref.G, US20140145511 to Renzi, and ref.M, US20070150198 to MacDonald, are not listed in this IDS since they ware already of record in this application).

International Search Report and Written Opinion dated May 26, 2020 of co-pending U.S. Appl. No. 17/440,888; with partial translation and partial machine translation (total 23 pages).

Chinese Office Action dated Nov. 29, 2022 in counterpart application No. CN201880060174.3; w/ English machine translation (total 21 pages) (note: JP2002-351942, D2, US20100154999, D5, and FR3016002, D6 cited in the Chinese Office Action are not listed In this IDS since they were already listed in the IDS filed May 11, 2022 and Jan. 28, 2020, respectively).

* cited by examiner

METHOD FOR TESTING COMPATIBILITY

The present invention relates to the field of electrically stand-alone home-automation devices that are powered with solar energy. The present invention more particularly relates to a method for testing compatibility between the energy requirements of an electrically stand-alone home-automation device comprising at least one photovoltaic module and a predefined site for the photovoltaic module.

Electrically stand-alone home-automation devices that are supplied with electrical energy generated by solar energy are known, examples of such devices being roller shutters, sun blinds, swing shutters, gates, etc. One advantage of these devices is that they do not need to be plugged into a mains grid. This solution may be advantageous, for example, in the context of renovation, because installation of these devices does not require new electrical lines to be run from the electricity meter to the sites chosen for installation of these devices.

However, the place where the electrically stand-alone home-automation device is installed is rarely located on a piece of land that is completely free of any obstacles, such as buildings or vegetation. Thus, during the day, depending on the day of the year and/or the time of day, shadows may be projected onto the photovoltaic module of the home-automation device and thus decrease, or even stop, its production of electrical energy. This is one of the reasons why certain users lack confidence in the reliability of these electrically stand-alone home-automation devices. They hesitate to choose an actuator supplied electrically by solar energy for fear that the site chosen for the installation of the photovoltaic module will not receive a sufficient insolation to guarantee correct operation of the device throughout the year.

In this context, it would be advantageous to provide a solution that would make it possible to check whether the solar radiation actually received at a predefined site will allow a photovoltaic module installed at this site to deliver enough electrical power to the electrically stand-alone home-automation device for it to operate correctly throughout the year.

One aim of the invention is, especially, to correct all or some of the aforementioned drawbacks by providing a solution allowing to automatically test whether an electrically stand-alone home-automation device equipped with a photovoltaic module is capable of operating correctly at a predefined site.

To this end, one subject of the invention is a method for testing compatibility between the energy requirements of an electrically stand-alone home-automation device and a predefined site for a photovoltaic module, the electrically stand-alone home-automation device comprising the photovoltaic module, a device that closes, occults, protects from the sun or screens and an element for storing electrical energy that is configured to supply the device that closes, occults, protects from the sun or screens with power, the element for storing electrical energy being connected to the photovoltaic module and intended to be charged by the electrical energy generated by the photovoltaic module, the method comprising at least:

A step of selecting the electrically stand-alone home-automation device and storing, in a memory, data identifying the electrically stand-alone home-automation device, A step of obtaining, in particular via acquisition or via input, and storing, in a memory, signals representative of position data relating to the predefined site, A step of estimating and storing, in a memory, data of a sun chart at the predefined site, A step of computing an estimation of the variation in the amplitude of the solar radiation received at the predefined site over a year while taking into account the position of the predefined site and the shadow mask, A step of computing an energy balance on the basis of the variation in the amplitude of the solar radiation received at the predefined site and of the energy requirements of the selected electrically stand-alone home-automation device.

According to one mode of implementation, the method comprises a step of estimating a confidence index representative of the compatibility between the energy requirements of the electrically stand-alone home-automation device selected in the selecting step and the energy delivered by the photovoltaic module.

According to one mode of implementation, the method comprises a step of defining and storing, in a memory, data of a shadow mask representative of elements likely to project a shadow onto the predefined site.

According to one mode of implementation, the shadow mask is defined, especially automatically, on the basis of one or more photographs taken at the predefined site and/or on the basis of a film recorded at the predefined site.

The method may be implemented by means of a mobile terminal.

According to one mode of implementation, the defining and storing step comprises a substep of optimizing a value of an image-capture angle with respect to the normal to the sensitive surface of the photovoltaic module placed at the predefined site.

According to one mode of implementation, the value of the image-capture angle is optimized by considering three criteria, a first criterion dependent on the angle of incidence of the sun, a second criterion dependent on the response of the photovoltaic module and a third criterion dependent on the duration of insolation at the predefined position.

According to one mode of implementation, the method comprises a step of displaying complementary information relating to the electrically stand-alone home-automation device selected in the selecting step.

According to one mode of implementation, the step of computing the estimation of the variation in the amplitude of the solar radiation comprises:

a substep of estimating average insolation data at the predefined site and a substep of superposing the average insolation data with those of the shadow mask.

According to one mode of implementation, the step of estimating the confidence index comprises a substep of computing the daily number of operating cycles of the electrically stand-alone home-automation device selected in the selecting step, the daily number of operating cycles for example being averaged over a year.

According to one mode of implementation, the daily number of operating cycles of the electrically stand-alone home-automation device is computed iteratively.

According to one mode of implementation, the step of computing the energy balance comprises a substep of computing an energy balance over a complete year.

According to one mode of implementation, the estimation of the confidence index comprises computing a number of successive operating cycles that may be carried out by the electrically stand-alone home-automation device when the value of the charge of the element for storing energy is equal to a yearly threshold value. The threshold value may be the lowest value of the charge of the energy storing element over a year.

According to one mode of implementation, the estimation of the confidence index comprises computing the number of typical daily use scenarios that the electrically stand-alone home-automation device is able to handle when the value of the charge of the element for storing electrical energy is equal to a yearly threshold value. The threshold value may be the lowest value of the charge of the energy storing element over a year.

According to one mode of implementation, the position data comprise at least data on the location and on the orientation of the predefined site.

The invention also relates to a device for testing compatibility, especially a mobile terminal for testing compatibility, a fixed terminal for testing compatibility or a server for testing compatibility, comprising hardware and/or software elements that implement the method defined above, and especially hardware and/or software elements that are designed to implement the method defined above.

The invention further relates to a computer-program product that is downloadable from a communication network and/or stored on a computer-readable data medium and/or executable by a computer, characterized in that it contains computer-program code instructions for implementing the method defined above, when the program is executed by a computer.

The invention lastly relates to a computer-readable data-storage medium on which a computer program containing program-code instructions for implementing the method defined above is stored.

Other particularities and advantages of the present invention will become more clearly apparent on reading the following nonlimiting description, which is given by way of illustration with reference to the appended figures, in which.

Figure 1:
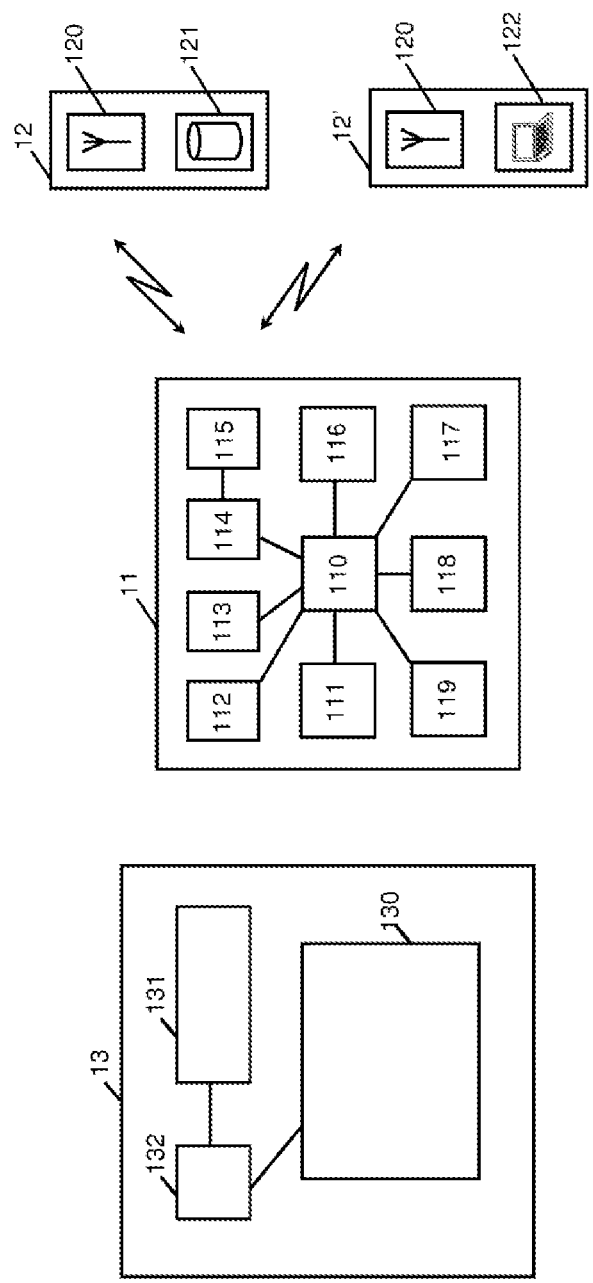
FIG. 1 shows an example of a configuration in which the method for testing compatibility is implemented by means of a mobile terminal.

FIG. 1 shows a completely nonlimiting example of a configuration comprising a mobile terminal 11, a remote server 12, 12' and an electrically stand-alone home-automation device 13, in which example a mode of implementation of the method for testing compatibility, according to the invention, is implemented by means of the mobile terminal 11.

It should be noted that the expression "mobile terminal" is used to mean any type of mobile device capable of being used to implement the testing method according to the invention, such as a laptop, a tablet computer, a smart phone, etc. However, in the following description, the expression "mobile terminal" will preferably be understood to mean a smart phone or a tablet computer. More generally, the mode of implementation of the method for testing compatibility may be implemented by any computer. The testing method may for example be implemented on a remote server to which a terminal connects in order to allow the parameters required by the testing method to be input and the results of the testing method to be obtained.

Preferably but not necessarily, such a mobile terminal 11 comprises a satellite navigation device 111, an orientation device 112 (such as a magnetometer or any other sensor configured to deliver an electrical signal representative of the orientation of the mobile terminal 11) and an accelerometer 113 or any other sensor configured to deliver an electrical signal representative of the inclination of the mobile terminal 11.

The mobile terminal 11 may comprise a communication module 114 configured to dialogue, for example, with at least one remote server 12, 12' using a communication protocol. The communication module 114 may be connected to communication means 115 which may or may not be integrated into the mobile terminal 11.

Nonlimitingly, the mobile terminal 11 may comprise at least one display module 116, at least one image-processing module 117, at least one computing module 118 and at least one memory 119.

These various modules 114, 116, 117, 118, of the mobile terminal 11, may be one or more microcontrollers, microprocessors, processors, computers or any other suitably programmed equivalent means.

The mobile terminal 11 may comprise at least one processing unit 110 comprising at least one processor and at least one memory zone.

Below, the various memory zones are all referred to as "a memory" irrespectively of whether the terminal possesses one or more memory zones. This memory 119 may be that of the processing unit 110, of a processor, of a module or any other memory of the mobile terminal 11 irrespectively of whether it is integrated into the latter or not.

The communication module 114 of the mobile terminal may be configured to communicate with the at least one remote server 12, 12' via communication means 115 and via at least one communication protocol.

The remote server 12, 12' may comprise communication means 120 and at least one memory 121. According to another embodiment, the remote server 12, 12' may comprise communication means 120 and a web service 122.

The electrically stand-alone home-automation device 13 comprises, nonlimitingly, at least one photovoltaic module 131, at least one element 132 for storing electrical energy, which is connected to the one or more photovoltaic modules, and an occulting device 130 that includes an electromechanical actuator. The photovoltaic module 131 may be mechanically integrated into the rest of the electrically stand-alone home-automation device 13. According to one embodiment, the photovoltaic module 131 may be located remotely from the electrically stand-alone home-automation device 13, for example, in order to move it away from a shadowy region or to install it on a site that receives a high insolation. In this case, the photovoltaic module 131 is not mechanically integrated into the rest of the electrically stand-alone home-automation device 13—it is connected to the rest of the electrically stand-alone home-automation device 13 only by an electrical cable.

Below, the expression "a photovoltaic module" will be understood to mean one or more photovoltaic modules. The same goes for the expression "an element for storing electrical energy", which will be used in the singular irrespectively of whether there is one or more than one element for storing electrical energy.

The element 132 for storing electrical energy is preferably a physico-chemical storage means such as a storage battery, a rechargeable battery, a supercapacitor or any other equivalent element. The element 132 for storing electrical energy is configured to supply the occulting device 130 with electrical energy and is intended to be charged by the electrical energy generated by the photovoltaic module 131.

An occulting device 130 comprises a motorized driving device that is able to make a screen move between at least one first position and at least one second position. The motorized driving device comprises the electromechanical actuator of a movable element that closes, occults or protects from the sun, such as a roller shutter, a swing shutter, a door, a grille, a blind or any other equivalent hardware, and which will be referred to as a screen below. The motorized device may however also be a garage door or a motorized gate. The electromechanical actuator comprises an electric motor, an output shaft and an electronic control unit (which are not shown). In particular, the electromechanical actuator is a tubular actuator, which is intended to be inserted into a tube around which the screen is rolled.

Figure 2:
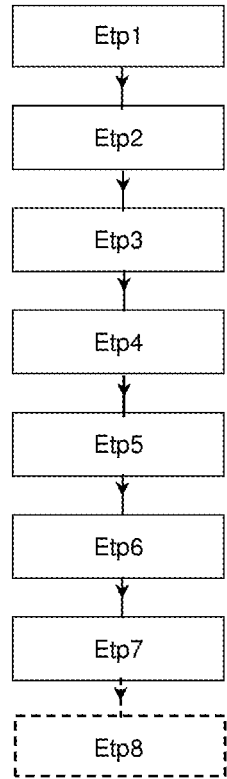
FIG. 2 shows the steps of the method according to one example of a mode of implementation of the invention.

FIG. 2 shows the steps of the method for testing compatibility between the energy requirements of a motorized driving device of an occulting device 130 and a predefined site according to one example of an embodiment of the invention.

The expression "predefined site" refers to the site on which the user would like to install the photovoltaic module 131 of an electrically stand-alone home-automation device 13 and on which or at which the user tests insolation.

The aim of the method for testing compatibility is to check whether the predefined site benefits from a sufficient insolation throughout the year to allow the photovoltaic module 131 of an electrically stand-alone home-automation device 13 to be installed and this electrically stand-alone home-automation device 13 to operate correctly throughout the year.

When an electrically stand-alone home-automation device 13 is said to "operate correctly", what is meant is that the occulting device 130 of this electrically stand-alone home-automation device 13 is able to be used to meet predefined requirements or to perform each day a number of operating cycles that is at least equal to a predefined threshold.

By "operating cycle", what is meant for example is a movement that completely opens the screen or a movement that completely shuts the screen.

The method is configured to automatically test the compatibility between the energy requirements of the motorized driving device of the occulting device 130 and the capacity of the elements 132 for storing electrical energy of the electrically stand-alone home-automation device 13 supplied with the electrical energy delivered by its photovoltaic module 131 when the latter is positioned at the predefined site.

The testing method may be implemented by means of any type of terminal such as a mobile terminal or a fixed terminal, a desktop computer for example. Preferably, but nonlimitingly, the testing method is implemented by means of a mobile terminal 11. Below, the testing method will be described with reference to such an implementation.

The method for testing compatibility comprises a first step Etp1 of selecting and storing, in a memory 119 of the mobile terminal 11, an electrically stand-alone home-automation device 13.

According to one mode of implementation of the method, a display module 116 may display, on a screen of the mobile terminal, a list of types of electrically stand-alone home-automation devices 13. This list of electrically stand-alone home-automation devices 13 may be contained in a first database stored in a memory 119 of the mobile terminal 11 or in a memory zone exterior to the mobile terminal 11, a memory 121 of a remote server 12, 12' for example. The display of the list of the selectable types of electrically stand-alone home-automation devices 13 may be of any known type. The display may be achieved, for example, in the form of at least one list, of at least one table, of icons, of one or more drop-down menus or any other equivalent form of display of selectable elements. The user may then choose, from the displayed list, the electrically stand-alone home-automation device that he would like to install on the predefined site. The selection may be made via action on a human-machine interface, such as a touchscreen, a real or virtual keyboard, a scroll wheel or any other interface.

According to another mode of implementation of the method, the selection may be made by the user via entry of data allowing an electrically stand-alone home-automation device to be identified. To this end, the display module 116 of the mobile terminal 11 may trigger, on the screen of the mobile terminal, the display of a window or of a field in which the user may enter, via a human-machine interface, data allowing the electrically stand-alone home-automation device 13 to be tested to be identified. It may for example be a question of a product reference, a product name, a code or any other identifier of an electrically stand-alone home-automation device 13.

According to another mode of implementation of the method, the selection may be made by the user via digitization of a one- or two-dimensional barcode, for example of a catalogue, using an optical sensor internal or external to the mobile terminal 11, a camera incorporated into the mobile terminal for example.

According to another mode of implementation of the method, the selection may be made via a radio-frequency-identification (RFID) tag, a near-field-communication (NFC) tag or any other tag readable by a device available to the user, such as a mobile terminal 11.

According to one mode of implementation of the method, the selection may be followed by a step of confirming the selection made before passing to the following step.

According to one mode of implementation of the method, this selection may be followed by a substep of obtaining and storing, in a memory 119 of the mobile terminal 11, complementary data regarding the occulting device 130 associated with the selected electrically stand-alone home-automation device 13. The user may be invited, by the display module 116 of the mobile terminal 11, to input the dimensions of the occulting device 130. A display of the mobile terminal may invite the user to enter, for example, the dimensions or the weight of the window or of the door on which the selected electrically stand-alone home-automation device will be installed. To this end, the display module 116 of the mobile terminal 11 may trigger, on the screen of the mobile terminal 11, the display of a window or of a field in which the user may be invited to enter, via a human-machine interface, the dimensions or the weight of the occulting device 130.

The user may also be invited to input the material from which the screen of the occulting device 130 is made.

Preferably, this information may be input by selecting one material from a list depending on the type of electrically stand-alone home-automation device 13 selected. When the user does not know the material from which the screen is made or hesitates between a number of materials, this field may not be filled in or the list may comprise an element of the type "not known". According to one mode of implementation, when the material of the screen is not input, the latter may be output data and depend on the compatibility test: the mobile terminal 11 may propose one or more materials, for the screen of the occulting device 130, that are compatible with the obtained results.

To this end, the step Etp1 of selecting and storing the electrically stand-alone home-automation device 13 may comprise a substep of selecting and storing, in a memory 119 of the mobile terminal 11, the material of the screen. As described above, this substep may be implemented by the display module 116 of the mobile terminal 11.

The display module 116 may trigger, on the screen of the mobile terminal 11, the display of a list of materials for the screen of the occulting device. This list of materials may be contained in a database stored in a memory 119 of the mobile terminal 11 or in a memory zone exterior to the mobile terminal 11, such as a memory 121 of a remote server 12, 12'. The display of the list of the selectable materials may be of any known type, and for example takes the form of at least one list, of at least one table, of icons, of one or more drop-down menus or of any other equivalent form of display of selectable elements. The user may then select the chosen material via action on a human-machine interface, such as a touchscreen, a real or virtual keyboard, a scroll wheel or any other interface.

According to another mode of implementation of the method, the selection may be made by the user by directly entering the chosen material via a human-machine interface. To this end, the display module 116 of the mobile terminal 11 may trigger, on the screen of the mobile terminal, the display of a window or of a field into which the user is invited to enter the material of the screen.

The selection of the electrically stand-alone home-automation device 13 may be followed by a substep of reading technical characteristics associated with the selected electrically stand-alone home-automation device 13 from a second database and of storing these technical characteristics in a memory 119 of the mobile terminal 11. The second database may be stored in a memory 119 of the mobile terminal 11 or in a memory zone exterior to the mobile terminal, that 121 of a remote server 12, 12' for example. The first and second databases may be one and the same database or separate databases.

When the second database is stored on a remote server 12, 12', the technical features associated with the selected electrically stand-alone home-automation device may be read via the communication module 114 of the mobile terminal.

The technical characteristics associated with the selected electrically stand-alone home-automation device 13 may comprise, nonlimitingly, the following parameters: the daily average electrical consumption of the occulting device 130, and/or that of its motorized driving device, for a given number of operating cycles and/or a number of actions, the consumption of various actions of the occulting device 130, the nominal torque delivered by the motorized driving device, the type and number of photovoltaic modules 131 associated with the occulting device 130, the area and the efficiency of the one or more photovoltaic modules 131, the type and number of elements 132 for storing electrical energy and the technical characteristics thereof such as the capacity thereof, the self-discharge thereof, etc.

By way of illustration, in the case of an application to one or more roller shutters, an operating cycle may correspond to the screen being completely raised and completely lowered. In the same way, in the case where a swing shutter, a gate or a motorized door is used, an operating cycle may correspond to the screen being opened and closed. Likewise, an action may correspond, for example, to orientating the slats of a Venetian blind, to partially raising or lowering the screen of a roller blind, to a specific action such as locking the screen or to any other action that the occulting device is able to perform.

According to one mode of implementation of the method, depending on the selected electrically stand-alone home-automation device 13, on the dimensions thereof input and optionally on other parameters, such as the weight or material of the screen of the associated occulting device 130, the mobile terminal 11 may select a type of electromechanical actuator, one or more photovoltaic modules 131 and/or one or more energy-storing elements 132. According to one variant of implementation, the mobile terminal may reiterate all of the testing method for various photovoltaic modules 131 and/or various energy-storing elements 132.

The method comprises a step Etp2 of obtaining and storing, in the memory 119 of the mobile terminal 11, signals representative of position data relating to the predefined site. The position data may comprise the location, i.e. the geographic location or position, the orientation and/or the inclination of the predefined site. By "orientation", what is meant is the angle made by the normal to the photosensitive plane of the photovoltaic module and a cardinal direction. By "inclination", what is meant is the angle made by the normal to the photosensitive plane of the photovoltaic module and the vertical direction. The position is for example completely defined by the following parameters: longitude, latitude, azimuth and angular height. A value of each of these parameters forms parts of an item of position information. Step Etp2 may comprise substeps of obtaining and storing, in the memory 119 of the mobile terminal 11, signals representative, respectively, of the location, of the orientation and optionally of the inclination of the predefined site. These position data may, for example, be estimated by the user using one or more mobile applications stored in a memory 119 of the mobile terminal, the user placing himself in proximity to the predefined site.

The location may be determined via the signals delivered by a geopositioning device that is located on-board the mobile terminal and that uses a global navigation Satellite system (GNSS) such as the GPS system, the Galileo system, the Glonass system or any other equivalent system. The mobile terminal may display, for example, the longitude and latitude of the predefined site.

According to one mode of implementation, the mobile terminal may for example display the name of the town or city and/or the postcode of the town or city in which the mobile terminal is located or any other type of location. The mobile terminal may also display the altitude of the predefined site.

The location may also be directly input by the user, for example when the availability of the satellite-navigation signals is insufficient to obtain an estimation of the location or when the mobile terminal is not equipped with a satellite-navigation device. The display module of the mobile terminal may, for example, trigger, on the screen of the mobile terminal, the display of a window or of a field in which the user may enter information on the location of the predefined site, such as the name of the town or city in which it is located and/or its postcode. This information may be input by the user, for example, using a human-machine interface of the terminal such as a touchscreen, a real or virtual keyboard or any other equivalent interface. Below, the communication module 114 of the mobile terminal may interrogate a web service 122 hosted on a remote server 12, 12', via a communication protocol, in order to obtain the coordinates of the town or city in which the user is located.

According to one variant of implementation of the method, the coordinates of the predefined site may be input directly by the user without needing to interrogate the remote server 12, 12'.

According to another example of implementation, the location information entered by the user may be used to check the position data of the predefined site estimated by the mobile terminal. If the two positions coincide, the user may validate the position data determined by the mobile terminal 11. In the contrary case, the user may retake a position measurement using the mobile terminal or use the position data estimated by the mobile terminal 11.

The orientation of the predefined site may be provided by the mobile terminal positioned on the predefined site or with a similar orientation to that of the predefined site. The orientation may for example be provided by a software application of the mobile terminal 11 using signals delivered by an orientation device installed in the mobile terminal of the user. It may be a magnetometer or any other sensor configured to deliver a signal representative of the orientation of the mobile terminal. The orientation may also be input directly by the user, for example when the mobile terminal is not equipped with an orientation device or for the sake of redundancy, in order to confirm the position of the predefined site provided by the mobile terminal 11. Advantageously, this confirmation may make it possible to compensate for a poor calibration and/or a low precision of the sensor of the mobile terminal and/or a measurement error due to the presence of an element disrupting the measurement of the Earth's magnetic field by the mobile terminal, such as a magnet or any other magnetic element.

According to one variant of implementation, the communication module 114 of the mobile terminal 11 may interrogate, via a communication protocol, a web service 122, hosted on a remote server 12, 12', with the data on the position of the predefined site. These position data may be obtained, for example, from signals delivered by a geo-positioning device located on-board the mobile terminal or from location data input by the user such as the name of the town or city in which it is located and/or its postcode. In return, the communication module 114 may receive data representative of a satellite view corresponding to the position data and transmit them to a display module. The display module 116 may then display, on a touchscreen of the mobile terminal 11, the corresponding satellite view and invite the user to indicate the position of the predefined site. The user may, for example, be invited to select the house and the facade on which he wants to perform the compatibility test. This selection may, for example, be made by drawing a line, on the touchscreen, using a finger or a stylus, on the image of this facade. In return, a computational module 118 of the mobile terminal may compute the orientation of the predefined site and store signals representative of this orientation in the memory 119 of the mobile terminal 11. Advantageously, this variant allows the orientation of a predefined site to be automatically obtained using a mobile terminal 11 possessing no magnetometer. It also allows the data delivered by the magnetometer of the mobile terminal to be checked or, optionally, a magnetometer to be calibrated.

According to one mode of implementation of the method, the mobile terminal 11 may also display the inclination of the predefined site, for example, by exploiting the electrical signals delivered by an accelerometer, an inclinometer or any other equivalent device located on-board the mobile terminal 11. As mentioned above, the measurement of the inclination may also be input by the user via similar means to those described above.

According to one variant of implementation of the method, the value of the inclination of the predefined position may not be measured and be considered to be constant. According to a first example, it is possible to consider that the electrically stand-alone home-automation device 13 will be installed on a wall that is vertical with respect to the ground and therefore that its photovoltaic module 131 will also be parallel to this vertical. Below, the term "vertical" will always refer to the vertical with respect to the ground.

According to another example, the photovoltaic module 131 associated with the occulting device 130 may be mounted on a mechanical holder that is not parallel to the wall on which the occulting device is installed. In this case, the inclination of the photovoltaic module 131, and therefore of the predefined site, will be related to the geometry of this mechanical holder. The value of the inclination may, for example, form part of the technical characteristics associated with the selected electrically stand-alone home-automation device 13 read after its selection in the step Etp1.

Once determined and optionally, checked, these various items of information relating to the position of the predefined site may be stored in the memory 119 of the mobile terminal 11.

All or some of this step Etp2 may be performed again in case of measurement error, such as an error in the positioning of the mobile terminal 11.

The method comprises a step Etp3 of estimating and storing, in a memory 119 of the mobile terminal 11, signals representative of a sun chart at the predefined site.

It will be recalled that a sun chart, also called a chart of the sun's path, indicates, for various times of the year, the angular height (also called angle height or elevation) of the sun and the azimuth of the horizontal projection of the sun's radiation for a given latitude. This sun chart allows the path of the sun perceived from this place to be defined for various days of the year. It may comprise, for various times of day and for various days of the year, the position of the sun with respect to the predefined site, in spherical coordinates for example. This sun chart allows the times at which direct solar radiation is incident on a given surface to be defined.

Figure 3:
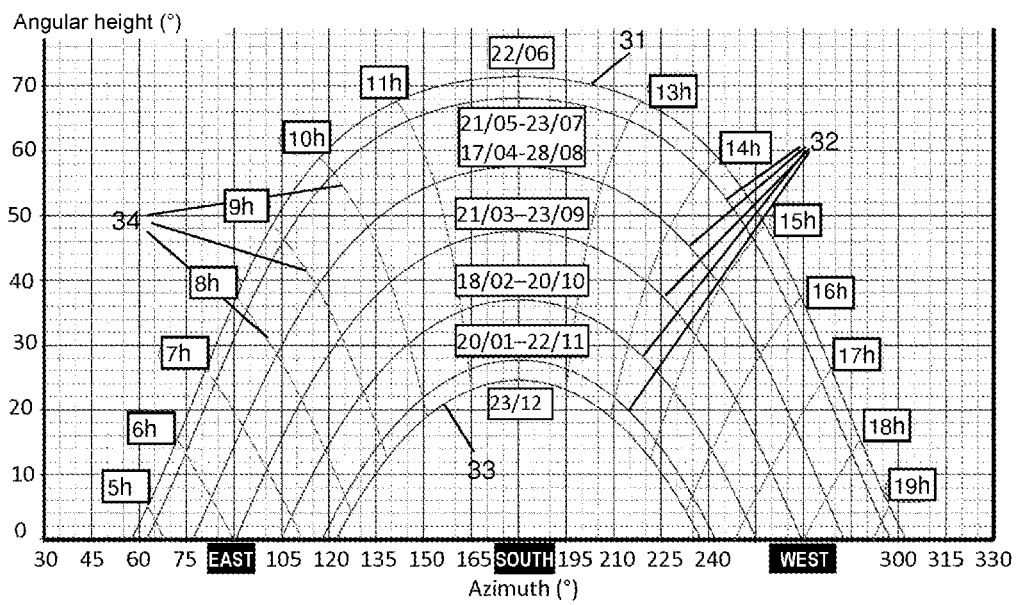
FIG. 3 shows one example of a graphical representation of a solar chart centered on south.

FIG. 3 is an example of a graphical representation of a sun chart for a given latitude and a given longitude. Each curve 31, 32, 33 represents the apparent path of the sun as a function of time for a particular date of the year. For example, the curves referenced 31 and 33 represent the apparent path of the sun at the summer solstice and at the winter solstice, respectively. These two curves 31, 33 allow an envelope in which the various apparent paths of the sun are located for the latitude and longitude in question to be defined, for one complete year. The curves referenced 34 represent various particular times of day. This figure allows, for a given latitude, the azimuth and the angular height of the sun at various times of a year to be visualized. For example, at the latitude and longitude in question, on 22 June at ten o'clock (solar time) the sun has an angular height of 58°, with respect to the horizon, and its azimuth is 118° to the east, with respect to north.

In order to estimate the sun chart at the predefined site, the communication module 114 of the mobile terminal 11 may interrogate, via a communication protocol, a web service 122 with the position data of the predefined site. In return, the communication module 114 may receive the positions of the sun, for example in spherical coordinates, for various times of the year. These positions may, for example, be received for each minute and each day of a year.

According to one variant of implementation, the data of the sun chart may be less precise and, for example, contain the positions of the sun only for each week or each month of the year or for any other regular period. In this case, the missing data may, for example, be extrapolated or considered to be identical for each day of the period.

According to one variant of implementation, the computational module 118 of the mobile terminal 11 may compute the data of the sun chart for the predefined site using an algorithm stored in a memory 119 of the mobile terminal 11.

According to another variant, the mobile terminal 11 may contain, in a memory 119, sun-chart data tables for various latitudes. In the step of estimating the signals representative of the sun chart at the predefined site, the computational module 118 selects the data table corresponding to the latitude closest to the position of the predefined site.

The method may comprise a step Etp4 of defining and storing in a memory 119 of the mobile terminal data of a shadow mask, or in other words a solar mask.

This shadow mask is data representative of the various elements likely to project a shadow onto the predefined site and therefore onto the photovoltaic module 131 of the electrically stand-alone home-automation device 13 when the latter is installed at this predefined site. The shadow mask corresponds to any natural or artificial element likely to mask, at at least one time of day and/or of the year, all or some of the direct and/or indirect solar radiation incident on the predefined site. It may, for example, be a question of buildings or of parts of a building, such as the eaves of a building or a balcony of a higher story, vegetation such as a tree or hedge, mountains or any other type of topography elements. Depending on their distances with respect to the predefined site and depending on their height, these elements generate shadows that are localized, to a greater or lesser extent, on the one or more photovoltaic modules 131 associated with the occulting device 130 and generate, to a greater or lesser extent, losses in the electrical production. Faraway elements form the horizon line. They generate, due to their size and their distance, a shadow that may cover, during certain time ranges, some or all of the photovoltaic module.

This shadow mask may comprise the spherical coordinates of the points that form the outline of the various elements likely to mask the solar radiation that would otherwise fall on the predefined site. It may be defined in various ways.

According to a first mode of implementation, the shadow mask may be defined automatically by the mobile terminal using a software application that uses an algorithm stored in the memory 119 of the mobile terminal 11. The user may take a photograph using the mobile terminal 11, for example via a photography software application, with the mobile terminal positioned on the predefined site.

When the photovoltaic module 131 of the selected electrically stand-alone home-automation device 13 is placed on a mechanical holder that is inclined with respect to the vertical, the user may take the photograph while ensuring that the optical axis of the objective of the mobile terminal 11 and the mechanical holder are perpendicular. To this end, the photography software application of the mobile terminal 11 may comprise an assistant that indicates, to the user, how to incline the mobile terminal.

Below, the optical axis of the objective of the mobile terminal will be assumed to be perpendicular to the mobile terminal 11. It will also be assumed that the value of the angle made by the mechanical holder of the photovoltaic module 131 and the vertical with respect to the ground has been input beforehand. This angle value may, for example, have been input by the user. According to another mode of implementation, the value of this angle may form part of the technical characteristics associated with the electrically stand-alone home-automation device 13.

The assistant of the software application may indicate, to the user, the inclination to give to the mobile terminal 11 so that the value of the angle made by the mobile terminal 11 and the vertical corresponds to that of the angle of the mechanical holder of the photovoltaic module 131 with respect to the same vertical. The software application may, for example, compare the value of the angle delivered by an accelerometer or an inclinometer located on-board the mobile terminal with that of the holder and, when the two angle values are substantially equal, send a signal. This signal may, for example, be an audio signal, a luminous signal, a vibration or any other type of signal perceivable by the user.

According to one variant of implementation, the user may store a photograph, taken using a camera positioned on the predefined site, in the memory 119 of the mobile terminal 11. As mentioned above, when the photovoltaic module 131 of the selected electrically stand-alone home-automation device 13 is placed on a mechanical holder that is inclined with respect to the vertical, the user may take the photograph while ensuring that the value of the angle made by a perpendicular to the optical axis of the objective of the camera and the vertical (defined with respect to the ground) is substantially equal to that of the angle made by the mechanical holder and the same vertical.

Depending on the position of the predefined site, a photograph taken vertically at this site may not capture all of the information required to define a precise shadow mask. Specifically, the value of the field angle of an objective of a mobile terminal 11 is lower than that of the field of a photovoltaic module 131. It will be recalled that the field of a photovoltaic module corresponds to the angular space, in azimuth and in angular height, able to be captured by the photovoltaic module. This field corresponds to the difference between the two extreme angles of incidence, in azimuth and in angular height, of solar radiation allowing a photovoltaic module to produce an electrical-energy value higher than a predefined threshold value. By way of example, an objective of a mobile terminal 11 generally possesses a field angle of about 50° in azimuth and 35° in angular height whereas a photovoltaic module 131 generally possesses a field of about 160° in azimuth and in angular height.

Figure 4:
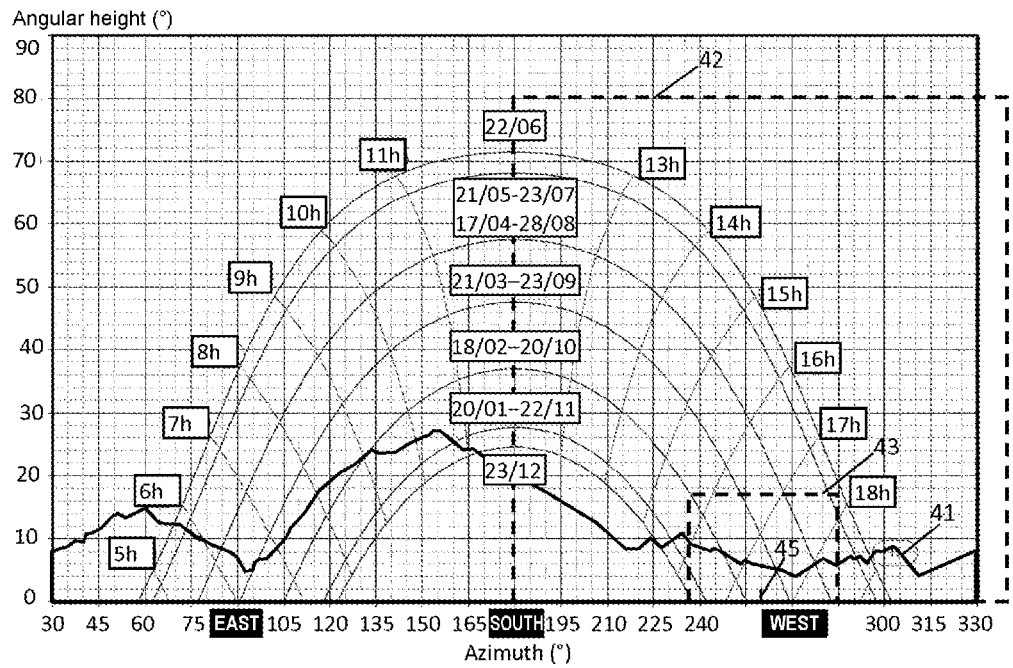
FIGS. 4 and 5 shows the sun chart of FIG. 3 with a shadow mask superposed thereon.
Figure 5:
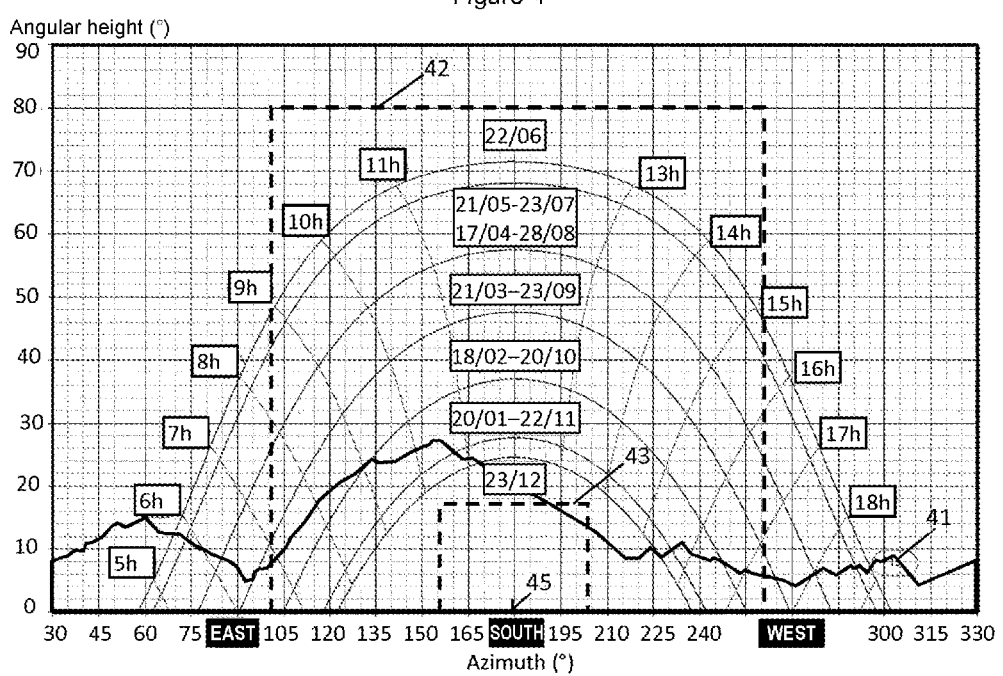

By way of illustration, FIGS. 4 and 5 show the sun chart of FIG. 3 with superposed thereon the various elements 41 likely to mask the sun's radiation. Boxes 42, 43 respectively representing the field of a photovoltaic module 131 placed on a vertical holder, a wall for example, at the predefined site 45 and the field angle of the objective of a mobile terminal 11 also placed at this predefined site 45, also feature in these figures. These two boxes 42, 43 are centered on the coordinates (azimuth, angular height) of the predefined site 45.

In fact, in these two examples, since the angular height of the predefined site is zero, only the portion of the box corresponding to positive values of angle height has been shown.

In the two examples illustrated in FIGS. 4 and 5, the field of the photovoltaic module is assumed to have a value of 160° in azimuth and in angular height and the objective of the mobile terminal is assumed to possess a field angle of a value of about 50° in azimuth and 35° in angular height.

FIG. 4 shows the case of a predefined site 45 positioned at an azimuth of 260° with respect to north. In this configuration, an image captured at the predefined site allows a shadow mask to be defined in a relatively precise way. Specifically, the zone covered by the field angle of the objective contains a maximum of intersections with the paths of the solar radiation seen from the predefined site 45.

FIG. 5 shows another case in which the predefined site 45 is positioned at an azimuth of 180° with respect to north. This configuration shows that the field angle of the objective of the mobile terminal is too narrow to capture all of the information necessary to define a precise shadow mask. In addition, the intersection between the envelope encompassing the paths of the solar radiation over the year and the field angle of the objective of the mobile terminal is quite restricted. This field-angle value nevertheless allows a zone containing the path of the sun during the winter to be captured. This allows the detection of the presence or absence of elements likely to mask the solar radiation received by the photovoltaic module during the most critical period of the year, i.e. during the period in which the production of electrical energy is lowest.

In order to increase the precision of the step of defining the shadow mask, a first method may consist in increasing the field angle of the objective of the mobile terminal 11. This increase may be obtained by applying to the objective of the mobile terminal a complementary optic so as to obtain the equivalent of a fish-eye objective.

According to one variant of implementation, the user may take a plurality of photographs or a film from the predefined site while making the azimuth and the angular height of the angle of image capture vary. The photographs taken may then be combined so as to obtain a panoramic photograph covering a field similar to that of the photovoltaic module 131. A graphical interface may assist the user in the production of this film or these photos, this interface displaying on the same screen (for example in polar coordinates):
the field 42 consisting of all of the directions from which the photovoltaic module is able to receive and to convert solar energy,
the zones for which one or more photographs and/or a film have or has already been recorded, and
optionally, a box or a pointer or cursor zone indicating the outlines of the field of the objective of the mobile terminal 11 in its current or instantaneous position. This position may be determined by the orientation device 112.

The field 42 may occupy the entirety of an interface window. The zones for which one or more photographs and/or a film have or has already been recorded may be represented in this window by the already recorded photographic data; i.e. these zones contain a true representation of what is actually seen. Alternatively, zones for which one or more photographs and/or a film have or has already been recorded may be represented in this window by a defined or predefined color. The box or the pointer or cursor zone indicating the outlines of the field of the objective of the mobile terminal 11 in its current or instantaneous position may also be represented in this window by a defined or predefined color.

According to another variant of implementation, the user takes only a single photograph from the predefined site and optimizes the value of the image-capture angle. The aim of this optimization is to maximize the intersections between the zone covered by the objective and the path of the sun over a year. To this end, the step Etp4 of defining and storing the data of a shadow mask may comprise a substep of optimizing the value of an angle of image capture with respect to a straight line perpendicular to the predefined site. Advantageously, this optimizing substep allows the definition of the shadow mask to be simplified while ensuring the latter retains a satisfactory precision.

The computational module 118 is assumed to know the value of the field angle of the objective of the mobile terminal 11, i.e. this value is stored in a memory 119 of the mobile terminal 11. The computational module may obtain this value by reading parameters of the mobile terminal or by reading the meta data of photographs taken using the mobile terminal. According to one variant, this field angle may be input by the user, for example, when he applies to the mobile terminal an objective or a complementary optic, a fish-eye objective for example.

The computational module then seeks the value of the optimal image-capture angle allowing the solar mask to be defined. According to one mode of implementation, the optimization may be carried out as a function of angular height.

Reference is now made to FIGS. 4 and 5. Let A and H be the values of the azimuth and of the angular height of the center of the box 43 representing the field angle of the objective of the mobile terminal. Let $\alpha_a$ and $\alpha_h$ respectively be the value of the field angle in azimuth and in elevation height of the objective of the mobile terminal. Under these conditions, the coordinates of the four corners of the box 43 representing the field angle of the objective of the mobile terminal are $(A-\alpha_a/2; H+\alpha_h/2)$, $(A+\alpha_a/2; H+\alpha_h/2)$, $(A+\alpha_a/2; H-\alpha_h/2)$ and $(A-\alpha_a/2; H-\alpha_h/2)$.

According to a first mode of optimization, the computational module 118 may consider, for the angular height H, the value of the angular height of the sun at the summer solstice and that at the winter solstice and choose the average of these two values as optimal value of the angular height. In FIGS. 4 and 5, this amounts to placing, in angular height, the center of the box 43 representing the field angle of the objective of the mobile terminal between the curve representative of the path of the sun at the summer solstice and the curve representative of the path of the sun at the winter solstice.

According to one variant, the value of the image-capture angle may be chosen so as to promote the detection of topography elements that are likely to mask solar radiation at the predefined site. To do this, the computational module may seek the value of the image-capture angle of the mobile terminal allowing the field angle of its objective to cover the positions of apparent paths of the sun close to the winter solstice. This variant amounts to positioning the box 43 representing the field angle of the objective of the mobile terminal, inside the envelope containing the various apparent paths of the sun, so that it is as close as possible to the curve representative of the path of the sun at the winter solstice. This angle value may, for example, be obtained by calculating the value of the angular height H such that the value of $H-\alpha_h/2$ is substantially equal to the value of the angular height of the sun at the winter solstice, $\alpha_h$ being the value of the field angle, in elevation height, of the objective of the mobile terminal.

According to one variant, the angle value may be obtained iteratively. Let A be the azimuth of the predefined site and a the value of the field angle of the objective of the mobile terminal. Initially, the computational module 118 initializes the value of H to zero. The computational module then tests whether the distance between one of the two points of coordinates $(A-\alpha_d/2; H-\alpha_h/2)$ and $(A+\alpha_d/2; H-\alpha_h/2)$ and a point on the path of the sun at the winter solstice is smaller than a predefined value. If so, the value H corresponds to the optimal image-capture angle. Otherwise, the computational module increments the value of H and repeats the test until the distance in question is smaller than the predefined value or until the entirety of the field of the photovoltaic module has been traced in angular height.

Advantageously, the fact of considering the path of the sun at the winter solstice allows elements likely to mask the sun's radiation at the worst moment of the year, i.e. the period of the year during which the production of electrical energy by a photovoltaic module is lowest, to be detected.

According to another variant, the value of the image-capture angle may be optimized so as to promote the detection of elements likely to mask the solar radiation located at height. It may for example be a question of the eaves of a roof. In this case, the computational module seeks the value of the image-capture angle of the mobile terminal allowing the field angle, of its objective, to cover the positions of apparent paths of the sun close to the summer solstice.

This angle value may, for example, be obtained by computing the value of the angular height H such that the value of $H+\alpha_h/2$ is substantially equal to the value of the angular height of the sun at the summer solstice, $\alpha_h$ being the value of the field angle of the objective of the mobile terminal in angular height.

According to one variant, the value of the image-capture angle may be obtained iteratively. Let A be the azimuth of the predefined site and $\alpha_h$ the value of the field angle in angle height of the objective of the mobile terminal. Initially, the computational module 118 initializes the value of H to $90°-\alpha_h/2$. The computational module then tests whether the distance between one of the two points of coordinates $(A-\alpha_d/2; H+\alpha_h/2)$ and $(A+\alpha_d/2; H+\alpha_h/2)$ and a point on the path of the sun at the summer solstice is smaller than a predefined value. If so, the value H corresponds to the angle height of the optimal image-capture angle. Otherwise, the computational module decrements the value of H and repeats the test until the distance in question is smaller than the predefined value or until the field of the photovoltaic module has been traced in angular height.

Once the value of the image-capture angle has been optimized, the photography software application of the mobile terminal may invite the user to take a photograph at the predefined site with this image-capture angle. To do this, the software application may comprise an assistant that indicates, to the user, the inclination to give to the mobile terminal. To this end, the software application may, for example, use the value of the angle delivered by an accelerometer or an inclinometer located on-board the mobile terminal. When the inclination of the optical axis of the objective of the mobile terminal is substantially equal to the value of the optimized image-capture angle, the software application may emit a signal such as an audio signal, a luminous signal, a vibration, an indication displayed on the screen or any other type of signal perceptible by the user.

Moreover, provision may be made for an indication to be displayed on the screen of the mobile terminal in order to facilitate the convergence of the orientation of the mobile terminal to the optimal image-capture position.

Figure 6:
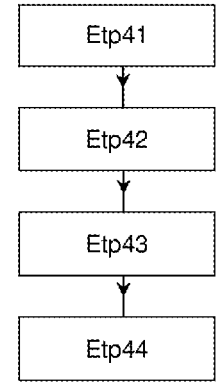
FIG. 6 shows the substeps of the step of defining and storing a shadow mask according to one example of a mode of implementation of the invention.

According to another variant, the value of the image-capture angle may be optimized along the azimuthal axis and along the angle of the angle height. In this mode of implementation, which is illustrated in FIG. 6, the computational module starts by estimating three criteria, which are also referred to as indicators.

Figure 7:
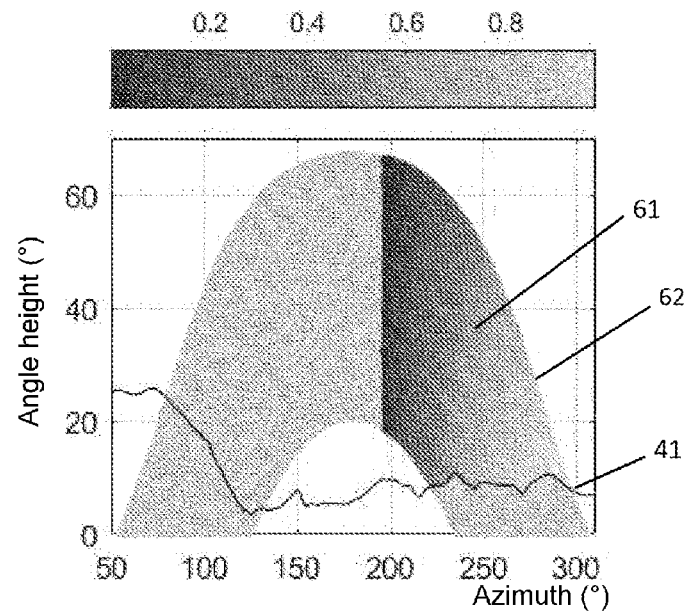
FIGS. 7 to 9 are the superposition of the graphical representations of the sun chart at the predefined site, of the shadow mask and respectively of the first criterion, of the second criterion and of the third criterion as a function of the position of the sun in the sky.

In a substep Etp41, a first indicator corresponding to the cosine of the angle of incidence of the sun as a function of the azimuth and of the angle height of the sun is estimated. FIG. 7 is a graphical representation of the superposition of the envelope 62 containing the various apparent paths of the sun at the predefined site, of the shadow mask 41 and of the curve 61 representative of the cosine of the angle of incidence of the solar radiation as a function of the azimuth and of the height of elevation of the sun. This first indicator expresses the fact that the direct solar radiation does not arrive perpendicularly to the sensitive surface of the photovoltaic module. Specifically, when the rays of the sun are perpendicular to the sensitive surface of the photovoltaic module, the direct solar radiation is maximal. In contrast, when the rays of the sun are not perpendicular to this surface, they cover a larger area, and the radiation received by the photovoltaic module is therefore less intense. This effect is known as the "cosine effect". This first indicator corresponds to a coefficient to be applied to the value of the maximum solar radiation in order to take into account the angle of incidence of the sun's rays.

Figure 8:
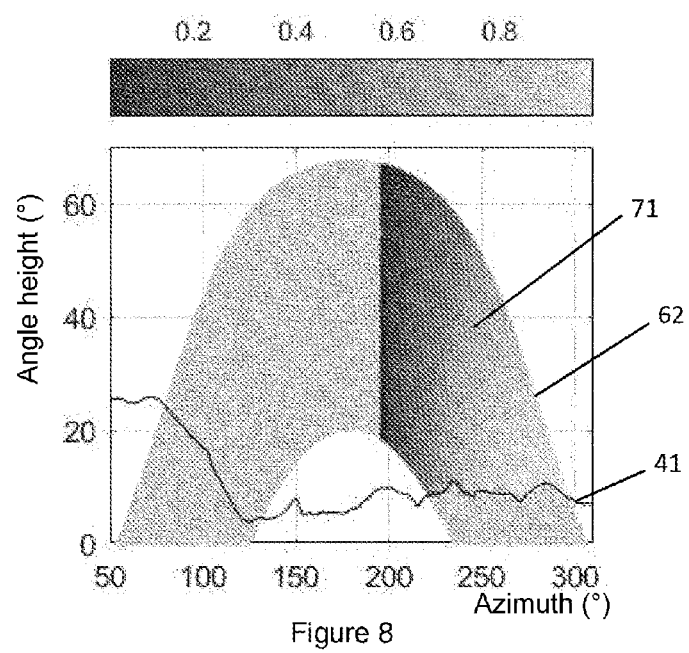

The optimization of the value of the image-capture angle comprises a substep Etp42 of estimating a second indicator corresponding to the response of the photovoltaic module 131 as a function of the azimuth and of the angular height of the rays of the sun. This second indicator corresponds to the incidence angle modifier (IAM), which describes the influence of the angle of incidence of the solar radiation on the efficiency of the photovoltaic module. When the solar radiation arrives perpendicularly to the sensitive surface of the photovoltaic module, there is no or very little reflection from the surface of the photovoltaic module. In this particular case, the efficiency of the photovoltaic module is maximal and the value of the incidence angle modifier is equal to 1. The efficiency curve that characterizes the performance of the photovoltaic module is defined with respect to this optimal angle of incidence. When the sun's rays deviate from the optimal situation, the reflection of the incident radiation from the surface of the photovoltaic module increases and the angle factor decreases and so does the efficiency of the photovoltaic module. FIG. 8 shows the superposition of the envelope 62 containing the various apparent paths of the sun at the predefined site, of the shadow mask and of the second indicator 71 as a function of the azimuth and the angle height of the sun.

If the value to be maximized is limited to these two criteria, the optimization will converge on zones in which this value is maximal and there is risk of having little or no information on several days of the year, in particular those in winter, on which the maximum values of the solar radiation remain low. However, it is operation on these winter days that determines the viability of the stand-alone photovoltaic system at the given site. In order to avoid such situations, a third criterion is introduced in order to take into account the relevance of a value of the radiation for a given position of the sun in the sky. The relevance of the value is defined as follows: the importance of the day in the computation increases as its length, and therefore the value of the total solar radiation received by the photovoltaic module over the day, decreases.

The computational module therefore estimates a third indicator that is proportional to the inverse of the duration of insolation at the predefined position in a substep Etp43. The third criterion allows a day-related weighting to be introduced into the estimation, this weighting increasing the importance of winter days on which the electrically standalone home-automation device is more likely to have difficulty operating.

Figure 9:
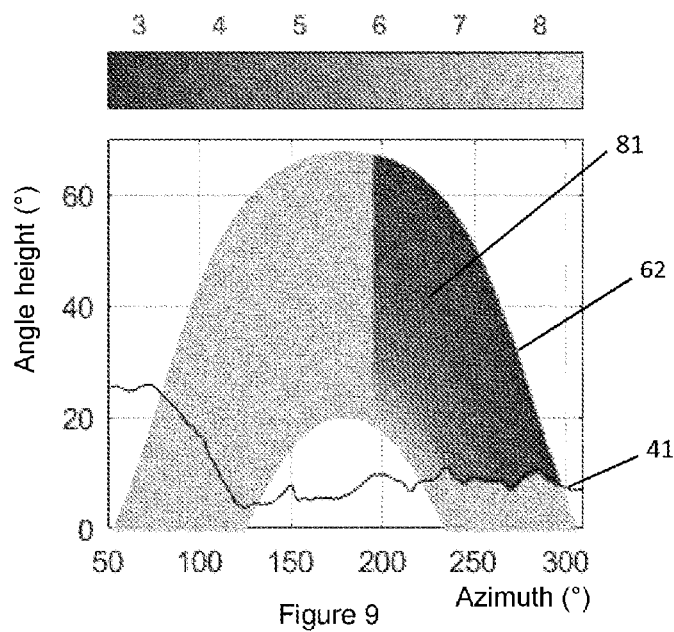

FIG. 9 illustrates the superposition of the graphical representation of this third criterion 81, of the envelope 62 containing the various apparent paths of the sun at the predefined site and of the shadow mask 41 as a function of the azimuth and of the angle height of the sun. In this figure, it may clearly be seen that winter days are weighted with a greater weight than summer days.

According to one mode of implementation, the estimation of the three aforementioned indicators may be limited to an angular range, in azimuth and in angular height, corresponding to the field of the photovoltaic module and centered on the coordinates of the predefined site.

According to one preferred mode of implementation, the estimation of the three aforementioned indicators may be limited to an angular range (azimuth, angular height) centered on the coordinates of the predefined orientation and/or of the predefined inclination and corresponding to the intersection of the field of the photovoltaic module with the envelope containing the various apparent paths of the sun at the predefined site.

Advantageously, the latter two modes of implementation allow the volume of computations to be carried out to be limited and therefore the computation time of the substep of optimizing the value of the image-capture angle to be decreased.

Figure 10:
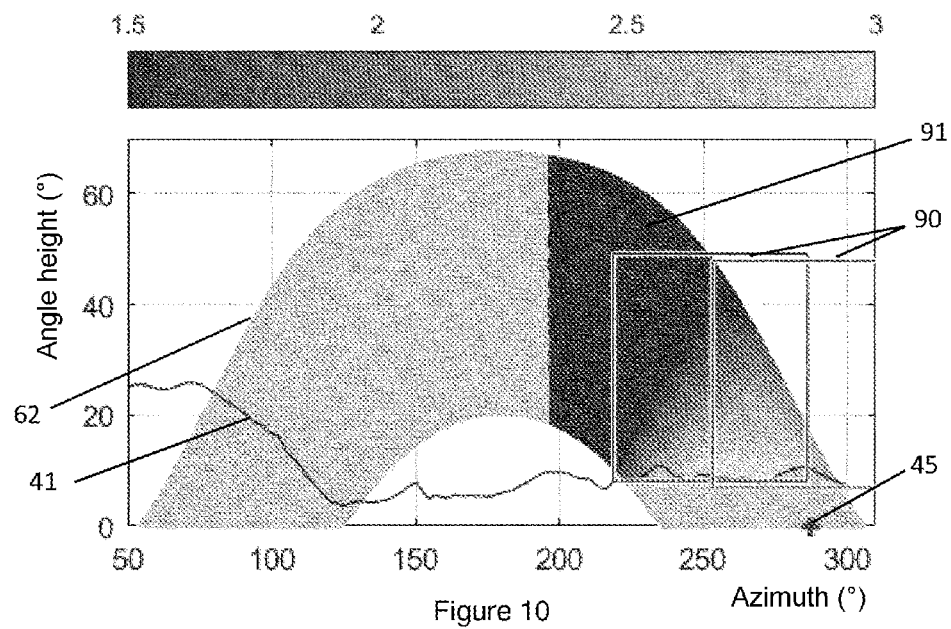
FIGS. 10 and 11 are the superposition of the graphical representations of the sun chart at the predefined site, of the shadow mask and of the product of the three criteria.

The product of these three criteria is then optimized in a substep Etp44. Initially, for each point in the range of values for which the three criteria were estimated, the computational module 118 estimates the product of the values of the three precedingly estimated criteria. The obtained result is shown, as a function of the azimuth and of the angle height of the sun, in FIG. 10 in superposition with graphical representations of the shadow mask 41 and of the envelope 62 containing the various apparent paths of the sun at the predefined site.

Subsequently, the computational module 118 seeks the optimal value of the image-capture angle (azimuth, height of elevation) allowing, at the objective of the mobile terminal, the zone containing the most relevant information to be captured. This zone, which is referred to as the "optimal zone" below, corresponds to the zone in which the value of the sum of the values of the products of the three criteria is maximal. The aim is to determine whether this optimal zone contains elements likely to mask at least some of the solar radiation that would otherwise be incident on the photovoltaic module. If this optimal zone contains no element likely to mask the solar radiation, the energy captured by a photovoltaic module 131 placed at the predefined site is maximal. If this optimal zone contains elements likely to mask at least some of the solar radiation, it is in this zone that the impact of these elements is maximum.

The optimal values of the azimuthal angle and of the angle height are obtained iteratively. To this end, an angular zone (azimuth, height of elevation) equal to the field angle of the objective of the mobile terminal is considered, in which zone the computational module performs a scan of the product of the values of the three criteria. This angular zone is represented, in FIG. 10, by a box 90. The coordinates of the center of this box 90 correspond to the coordinates of the site on which the mobile terminal is placed. Let A and H be the respective values of the azimuth and of the angular height of the center of the box 90 and $\alpha_a$ and $\alpha_h$ be the respective values of the field angle in azimuth and in angle height of the objective of the mobile terminal. Under these conditions, all of the points located inside this box have an azimuthal angle comprised between $A-\alpha_a/2$ and $A+\alpha_a/2$ and an angle height comprised between $H-\alpha_h/2$ and $H+\alpha_h/2$.

According to one mode of implementation, in order to find the value of the optimal image-capture angle, the computational module may initialize the value of the coordinates of the center of the box 90 corresponding to the angular zone captured by the objective and the sensor of the mobile terminal 11 to a predefined value. The computational module then estimates the sum of the values of the product obtained for each of the points present inside the box 90 and stores the value of the sum of the products in a memory.

The value of the coordinates of the center of the box 90 is then incremented by a predefined increment value, 1° for example, along the axis of the azimuth and/or along the axis of the angle height.

With this new position of the box, the computational module estimates the value of the sum of the values of the product obtained for each of the points present inside the box. This amounts to adding the value of the product obtained for each point the azimuth of which is comprised between $A-\alpha_a/2$ and $A+\alpha_a/2$ and the height of elevation of which is comprised between $H-\alpha_h/2$ and $H+\alpha_h/2$. The new value of the sum of the products is compared to the value stored in memory. If the new value is strictly higher than the value stored in memory, the computational module replaces the old value with the obtained new value.

The computational module reiterates this last operation until all the zone in which the product of the three criteria has been estimated has been covered by the box 90 representing the capture angle of the objective and of the sensor of the mobile terminal.

Figure 11:
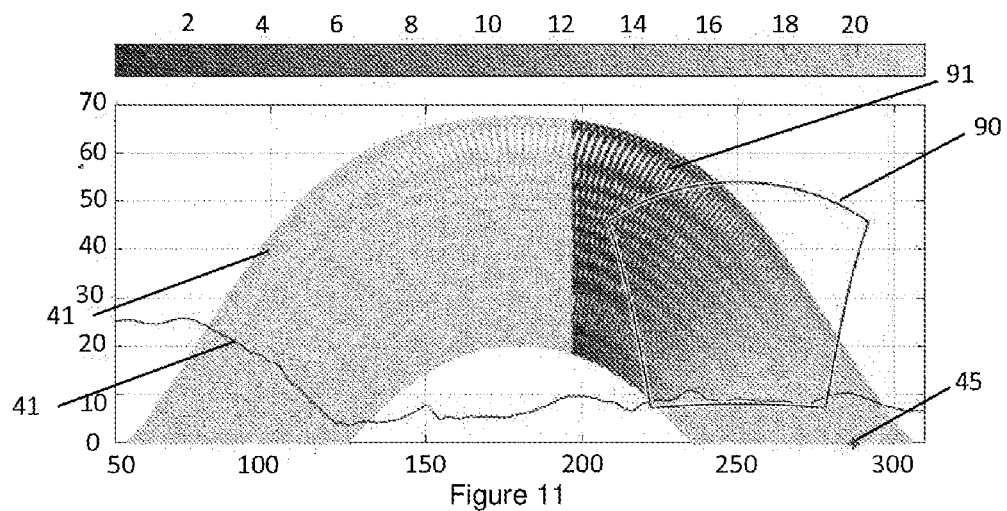

The optimizing substep has been described using figures showing a box 42, 43, 90 of rectangular shape. This description is completely nonlimiting and the box may be any shape: it may for example be the shape of a truncated disc segment. By way of illustration, FIG. 11 shows the same curves as those shown in FIG. 10 with a box corresponding to the angular zone captured by the objective and the sensor of the mobile terminal 11 in the shape of a truncated disc segment, to take into account the conversion of Cartesian coordinates into spherical coordinates.

According to one mode of implementation, in order to limit the volume of computations, the scan of the box in azimuth and/or in height of elevation may be carried out with an increment of a value higher than 1°, a value comprised between 2° and 10° for example. Similarly, the increments along the azimuthal axis and along the axis corresponding to the angle height may be of the same value or of different values.

According to another mode of implementation, the method for optimizing the value of the image-capture angle described above may take a degraded form. In this degraded mode, the search for the value of the optimal image-capture angle is carried out only along a single of the two axes, namely that corresponding to the angle height. During this optimization, the value of the azimuth of the center of the box corresponding to the angular zone captured by the objective of the mobile terminal 11 is kept constant and equal to the value of the azimuth of the predefined position. Advantageously, this degraded mode of implementation allows the volume of computations to be carried out to be minimized and therefore the time taken to optimize the value of the image-capture angle to be decreased.

As described in the non-degraded mode of implementation, the computational module estimates the three indicators described above and takes the product of these three indicators for each angle of incidence. In order to decrease the volume of computations, the estimations of the three indicators along the axis of the azimuths may be limited to a range of values corresponding to the field angle in azimuth of the objective of the mobile terminal.

As above, the computational module considers an angular scan zone equal to the field angle of the objective of the mobile terminal. The computational module initializes the value of the azimuth of the center of this angular zone to the value of the azimuth of the predefined site and performs a scan of the values of the product of the three criteria along the axis corresponding to the angular height. For each angle-height value, the computational module estimates the sum of the products obtained for each of the points present inside the angular scan zone and seeks the value of the angle height allowing this sum to be maximized.

Figure 12:
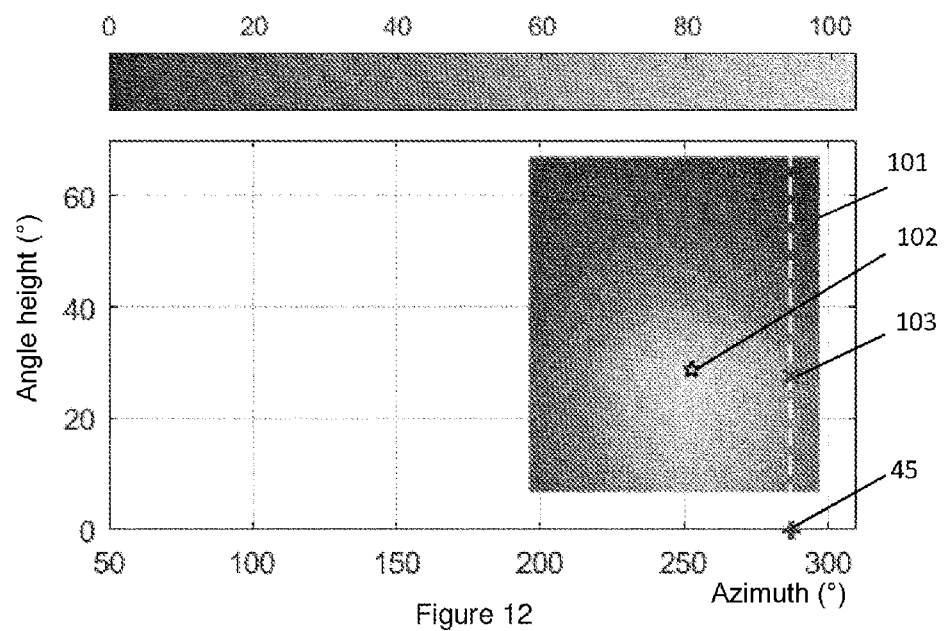
FIG. 12 is an illustration of results obtained after application of the optimizing substep.

FIG. 12 illustrates an example of results obtained by applying the two modes of implementation of the substep of optimizing the value of the image-capture angle, which modes were described above. This figure is a graphical representation of the sum of the products of the three criteria as a function of the position of the sun (azimuth and angle height) in the sky. It contains the optimal zone 101 and the optimal image-capture angle 102, 103, the objective of the mobile terminal having to be centered in azimuth and in elevation on the coordinates of this optimal capture angle. The reference 102 corresponds to the optimal image-capture angle when the optimization is carried out as a function of azimuth and of angle height. The reference 103 corresponds to the optimal image-capture angle in a degraded mode, when the optimization is carried out only as a function of angle height, the azimuth being equal to that of the predefined position.

Once the image capture from the predefined site has been carried out, an image-processing module 117 of the mobile terminal may scan the image, for example using a shape-detecting algorithm stored in the memory 119 of the mobile terminal 11, in order to automatically detect all of the elements likely to completely or partially mask solar radiation from the predefined site at at least one time of the day and/or of the year, and to delineate the shadow mask. The algorithm may also automatically detect the skyline, i.e. the line of separation between the sky and the ground, in the photograph. The algorithm automatically computes the azimuths and the angular heights of the outline of each element forming an obstacle to solar radiation falling on the predefined site. By way of illustration, the algorithm may use metadata of the photograph, such as the field-of-view angle, i.e. the aperture between the lateral limits of the field of view, the focal length of the objective or the size of the image sensor, to perform the computations of azimuth and angular height.

According to one variant of implementation, the shadow mask may be defined manually by the user. The user may, for example, delineate on the photograph, the outline of the elements likely to cast a shadow onto the photovoltaic panel. He may, for example, delineate the outline of the mask on the photograph using his finger, a stylus or any other equivalent tool. He may trace the horizon line or move the image of a line representative of a horizon line in the case of a flat or fairly smooth plot of land, until it coincides with the horizon line of the photographed view.

According to another variant of implementation, the user may move one or more geometric shapes over a screen of the mobile terminal 11, for example one or more squares or rectangles or one or more lines, in order to encircle the one or more elements likely to completely or partially mask the solar radiation from the predefined site, and thus approximately define the shadow mask.

According to another variant of implementation, the user may move, enlarge or shrink a geometric shape, such as a square or a rectangle, on the screen of the mobile terminal 11 until this shape approximately covers the main portion of the sky containing no elements likely to completely or partially mask the solar radiation from the predefined site.

According to another variant of implementation, the mobile terminal displays a fixed reticle and the user moves the mobile terminal 180° around the predefined site while making the reticle follow the outline of the obstacles. During the movement, the mobile terminal 11 determines the inclination and the azimuth of each point and stores them in the memory 119, in order to form the shadow mask.

Once the shadow mask has been defined, the latter may be stored in the memory 119 of the mobile terminal 11.

Once the position of the predefined site and a shadow mask have been defined, a study of the impact of the shadow mask on the insolation of the predefined site is carried out. To this end, a computational module 118 of the mobile terminal 11 may take into account the estimated position data and the shadow mask to estimate, in a step Etp5, the variation in the amplitude of the solar radiation received, over a year, by a photovoltaic module positioned at the predefined site.

By "amplitude of the solar radiation" what is meant is the power received by the photovoltaic panel per unit area expressed in $W \cdot m^{-2}$.

Initially, the computational module 118 of the mobile terminal may determine the solar radiation received by the predefined site from the position data of the latter. To this end, the step Etp4 may comprise a substep of estimating average insolation data for the predefined site.

According to one mode of implementation, the communication module 114 of the mobile terminal 11 may interrogate, via a communication protocol, a web service 122 with the position data (site, orientation, optionally inclination) of the predefined site in order to determine the amount of solar radiation that reaches this position, i.e. information on the insolation of the predefined site. In return, the communication module 114 may, for example, receive from the web service 122 average measurements of insolation over a year, average temperature values over a year, average measurements of the solar energy received by the predefined site over predefined periods of the year, etc. The communication module 114 may, for example, receive data on the insolation of the predefined site for each day of the year and each hour of the day. These various average metrological measurements may be collated into the form of a typical meteorological year (TMY). A typical metrological year is a file of climatic data relating to one year, made up of months representative of the average climate of the site in question. This file is a summary of a time series of a period of several years, taking the form of a single year representative of the period in question. The file is constructed by choosing, for each of the months of the year, the most representative month of all of the corresponding months in the period in question.

In order to decrease the number of data to be processed, the memory space used and the number of requests made to the web service 122, the communication module 114 of the mobile terminal 11 may receive, for each month of the year, the insolation data of a typical day or an average day representative of the various days of the month in question. The insolation data of this typical day may, for example, be equal to the monthly data divided by the number of days in the month. According to another example, the average day of the month may correspond to the day on which the solar declination is closest to the average declination of the month in question. It will be recalled that the solar declination corresponds to the angle made by the earth-sun direction and the plane of the earth's equator. This angle is positive to the north and negative to the south of the plane of the earth's equator. The data of this typical day are then reproduced for each day of the month in question.

According to another variant, the solar radiation received by the predefined site may be obtained by computation using a mathematical model that is, for example, stored in the memory 119 of the terminal 11.

For each day of the year, the radiation model delivers a theoretical curve of the solar radiation as a function of time and for clear-sky conditions. This theoretical model allows, when the sky is clear, the solar radiation to be estimated for a geographical zone, as a function of date, of time, of the longitude and latitude of the predefined site, of the orientation of the photovoltaic module, etc.

Using these theoretical data, a computational module 118 of the mobile terminal 11 may then establish an insolation for each day of the year and each hour of the day or for each hour of each typical day of each month of the year and apply a weighting in order to take into account metrological effects (clouds, etc.).

According to another variant, the mobile terminal 11 may contain in memory tables of average insolation values for a number of geographical zones. On the basis of the various average insolation data for the predefined site, of the path of the sun over the day and of the position of the sun over the year, a computational module 118 of the mobile terminal may estimate the solar energy theoretically received by the predefined site using an algorithm stored in the memory 119 of the mobile terminal 11.

In order to take into account the actual environment of the predefined site at which the photovoltaic module is intended to be installed, the step Etp4 may comprise a substep of superposing the average insolation data with those of the shadow mask defined beforehand. By superposing these data, the computational module 118 may thus estimate the average solar radiation actually received by the predefined site by weighting the theoretically received solar energy with the data of the shadow mask. The aim of this weighting is to take into account the losses of production of photovoltaic energy due to the various elements likely to intercept light that would otherwise reach the photovoltaic module and to project a shadow thereon. This average solar radiation actually received by the predefined site may be computed for each day of the year with a granularity of one hour, etc. It will be recalled that the granularity corresponds to the smallest element of detail managed by the computational model.

The method then comprises a step Etp6 of computing an energy balance. This computation is carried out on the basis of the variation in the amplitude of the solar radiation received by the predefined site, of the energy requirements of the selected electrically stand-alone device 13 and of the technical characteristics of the latter.

From the variation in the amplitude of the solar radiation received by the predefined site a computational module 118 of the mobile terminal may compute an estimation of the variation in the electrical energy generated, over a year, by the photovoltaic module 131 associated with the occulting device 130 installed at this predefined site depending on the technical characteristics of the photovoltaic module 131 of the selected electrically stand-alone home-automation device 13.

In this step Etp6, the computational module 118 of the mobile terminal estimates the total electrical energy produced by the photovoltaic module 131 over regular periods of the year. The computation is carried out on the basis of the average solar radiation actually received by the photovoltaic module 131 at the predefined site. To do this, the computational module 118 takes into account the data of the shadow mask and technical characteristics of the photovoltaic module 133 such as its nominal power, its area, its efficiency, etc. Preferably, the computational module 118 estimates the electrical energy produced by the photovoltaic module 131 over each day of the year and ideally for each hour of the day.

According to one mode of implementation, the computational module 118 may also take into account temperature when establishing the energy balance. Specifically, the technical characteristics of the photovoltaic module are generally given for a predefined temperature value. Generally, this temperature is equal to 25° C. When the temperatures of use of the photovoltaic module 131 are below this predefined temperature the efficiency of the photovoltaic module increases. In contrast, when the temperatures of use of the photovoltaic module are above this predefined temperature, efficiency is decreased. In order to take into account the temperature at the predefined site and thus correct the computed electrical energy values, the communication module 114 of the mobile terminal may interrogate a web service 122 in order to obtain the average temperatures of each day of the year or the average temperatures of each typical day of each month of the year. Ideally, these temperatures are data for each hour of the day. The produced energy values may be corrected by applying to the results a correction coefficient that is dependent on the difference in temperature between the temperature of use and the predefined temperature value. This correction coefficient may, for example, form part of the technical characteristics associated with the selected electrically stand-alone home-automation device 13, i.e. the characteristics read after the selection of the latter in step Etp1.

The estimation of the electrical energy produced by the photovoltaic module, for example, over one day, is then weighted by the charging efficiency of the element 132 for storing electrical energy of the selected electrically stand-alone home-automation device 13. This charging efficiency depends, in particular, on the temperature of use, on the level of charge of the element for storing electrical energy and on the level of current injected to charge it. This weighted estimation allows the potential charge of the element for storing electrical energy to be determined for each predefined regular period of the year. Preferably, the estimation is computed for each day of the year and ideally for each hour of the day.

In order to establish the, for example daily, energy balance, the computational module 118 of the mobile terminal 11 may also take into account the self-discharge of the element 132 for storing electrical energy over one day. This self-discharge depends on various parameters, such as the temperature and the charge of the elements for storing electrical energy. For example, at low temperature, the self-discharge is lower than at high temperature. Likewise, the element 132 for storing electrical energy discharges more rapidly when it is at full capacity then when it is partially charged. For the computation of the energy balance, the self-discharge of the element for storing electrical energy may be modelled by a parasitic consumption dependent, in particular, on the temperature of use of the electrically stand-alone home-automation device 13 and the level of charge of the element 132 for storing electrical energy.

While making the energy balance, the computation module 118 compares the charge of the energy-storing element 132, its self-discharge and the consumption of the occulting device 130, in order to estimate a confidence index in a step Etp7. The consumption of the occulting device 130 in particular depends on the consumption of the motorized driving device that is employed to move the screen. The confidence index corresponds to data representative of the compatibility between the energy requirements of the occulting device 130 and the predefined site intended to accommodate the photovoltaic module 131 associated with this occulting device 130. Its aim is to inform the user whether the selected electrically stand-alone home-automation device 13 will be able to operate correctly throughout the year either with its photovoltaic module 131 installed on the predefined site or with the electrically stand-alone home-automation device installed so that the position of the photovoltaic module corresponds to that of the predefined site. The confidence index may be established by considering one or more elements and/or by combining the results thereof.

According to a first mode of implementation, in order to define the confidence index, the computational module 118 of the mobile terminal 11 may compute the guaranteed maximum daily use of the occulting device over a year. The computational module 118 may compute the maximum number of operating cycles that the occulting device 130 is able to perform, each day of the year, without the value of the charge of the one or more elements 132 for storing electrical energy passing below a predefined threshold value. This maximum use may, for example, be computed using an iterative method. Initially, the computational module 118 considers a use of the occulting device 130 consisting in one operating cycle per day. Taking into account the technical characteristics of the occulting device, and in particular those of its motorized driving device, the computational module 118 may compute the consumption of the occulting device required to perform this number of operating cycles.

The computational module 118 of the mobile terminal may then, for each day of the year, compute the value of the charge remaining in the element 132 for storing electrical energy associated with the occulting device after this number of operating cycles. To do this, the computational module 118 of the mobile terminal 11 may consider the consumption of the occulting device 130, the current delivered by the photovoltaic module 131 and therefore the charge of the element 132 for storing electrical energy and the self-discharge of the latter. If this value of the remaining charge is higher than a predefined threshold value, the computational module 118 increments the number of operating cycles and restarts the computations for this new number of cycles. By way of completely nonlimiting illustration, the threshold value, which is also referred to as the depth-of-discharge limit, may be set to a value comprised between 0% and 30% of the maximum charge of the one or more elements 132 for storing electrical energy of the electrically stand-alone device 13. Preferably, the threshold value may be set to a value comprised between 10% and 20% of the maximum charge of the element 132 for storing electrical energy associated with the occulting device 130. If, during the computation, the computational module 118 finds a charge value that is below the threshold value, the computational module stops the computations and considers this number of cycles as being impossible to perform and retains the preceding value as the maximum possible number of daily operating cycles. In order to establish the possible number of operating cycles, the computational module 118 may perform the computation for each day of the year. According to another mode of implementation, the computational module may consider only a typical day per month, for example, in order to decrease the volume of computations.

Another element that may be taken into account to define the confidence index is the number of successive operating cycles that the occulting device 130 is able to perform before the value of the charge of the element 132 for storing electrical energy that is associated therewith drops below a predefined critical value. To this end, the computational module 118 chooses the worst day of the year, i.e. the day of the year for which the value of the charge of the element for storing electrical energy is the lowest. When the computational module 118 uses a typical day for each month of the year, it selects the typical day for which the value of the charge of the elements for storing electrical energy is the lowest. On the basis of the charge value for the selected day, the computational module 118 estimates the number of successive cycles that the occulting device 130 can perform before the value of the charge of the element 132 for storing electrical energy drops below the critical value.

According to one variant, the computational module may estimate the number of typical daily use scenarios that the electrically stand-alone home-automation device 13 may handle, without receiving any solar radiation, i.e. without receiving any new solar energy from the photovoltaic module thereof, for example following failure of the latter or because of climatic conditions that are extreme from the point of view of luminosity. Depending on the occulting device 130, the typical daily use scenario may be defined differently. By way of illustration, in the case of a roller shutter or of a swing shutter, it is possible to define a daily scenario as being one operating cycle, i.e. the shutter opening once and closing once. In the case of a motorized gate, it is possible, for example, to consider two operating cycles per day. As for the preceding case, the computational module considers the value of the charge of the element for storing electrical energy on the least favorable day of the year. It estimates the energy consumed by the occulting device over a typical day and, on the basis of the obtained result, computes the number of typical days that the occulting device 130 can handle before the value of the charge of the energy-storing element 132 that is associated therewith drops below the critical value.

According to one mode of implementation, in order to decrease the volume of computations, the computational module 118 may obtain an energy balance for a complete year. To this end, the step Etp6 of computing the energy balance may comprise a substep of computing an energy balance over a complete year. Before performing the computations for each day of the year or each typical day of the year, the computational module 118 may estimate the sum of all the energies accumulated over a year and the sum of all the consumptions (actuator consumption, self-discharge, etc.) over a complete year. If the sum of the consumptions is higher than the sum of the energy produced over the same period, it may be concluded that the system will not be able to operate without having to perform the complete computations.

According to one mode of implementation, the testing method may comprise a step Etp8 of displaying complementary information related to the compatibility test.

By way of illustration, when the compatibility test is positive, the display module 116 of the mobile terminal 11 may display on a screen of the latter a list of professional contacts that are able to sell and/or install the selected electrically stand-alone home-automation device 13 and that are geographically close to the place where this electrically stand-alone home-automation device 13 will be installed. To this end, the communication module 114 of the mobile terminal may interrogate, via a communication protocol, a database comprising a list of approved sellers and/or installers the distance of which with respect to the predefined site is smaller than a predefined value. The database containing the list of approved professionals may then be located in the memory 121 of a remote server 12, 12' or in the memory 119 of the mobile terminal 11. Advantageously, this second alternative allows this list to be consulted even in case of defective connectivity.

According to one variant of implementation, when the compatibility test is negative, the display module 116 may trigger, on a screen of the mobile terminal 11, the display of a message suggesting to the user that a new test be performed. The message may suggest that a new test be performed using, for example, one or more other models of photovoltaic module 131 that are more powerful and/or at least one other model of element 132 for storing electrical energy having a larger capacity and/or another screen material allowing, for example, another type of actuator that consumes less energy to be chosen, etc.

According to another example, the complementary information may comprise a summary of the configuration of the tested electrically stand-alone home-automation device 13 and of the results of the test, such as the maximum number of daily cycles executable, the number of successive cycles executable and/or the number of typical daily scenarios that can be handled without provision of additional energy. These various pieces of information will possibly, for example, be presented to the professional who sells and/or installs the selected electrically stand-alone home-automation device.

When in the step Etp1 of selecting the electrically stand-alone home-automation device 13 a parameter has not been provided, for example the material of the screen and/or the orientation and/or the inclination, this parameter, for example this material or a list of possible materials and/or an orientation and/or an inclination, may be suggested depending on the results obtained during the test.

Steps Etp1, Etp2 and Etp4 may be implemented in any chronological order.

Steps Etp2 and Etp4 may be implemented simultaneously when, for example, the user makes, on the mobile terminal, an action, in particular a triggering action, for example by pressing on a button. Specifically, this action may simultaneously trigger:
 the acquisition of a photograph or of a film; and
 the acquisition of position data, especially longitude and/or latitude and/or azimuth and/or angular height.

Another subject of the invention is a method for installing an electrically stand-alone home-automation device.

The installing method comprises a first step of implementing the method for testing compatibility between the energy requirements of the electrically stand-alone home-automation device 13 and a predefined site for installing a photovoltaic module 131 such as defined above.

If the result of the compatibility test is positive, the installing method comprises a step of installing the device 130 that closes, occults, protects from the sun or screens. The method also comprises a step of installing the photovoltaic module 131 on the predefined site. The method may comprise a step of installing the element 132 for storing electrical energy.

The invention has been described for an application to an electrically stand-alone home-automation device comprising a device 130 that closes, occults, protects from the sun or screens, but this description is in no way limiting. The invention may also be applied to other electrically stand-alone devices such as home-automation sensors, alarm equipment, small universal solar power supplies, lighting systems, path-marking systems and/or signaling/signage systems, for example for highway use, etc.

The invention also relates to a device for testing compatibility, especially a mobile terminal for testing compatibility, a fixed terminal for testing compatibility or a server for testing compatibility, comprising hardware and/or software elements that implement the method defined above, and especially hardware and/or software elements designed to implement the method defined above or means for implementing the method such as defined above.

The present invention has been described through an implementation using a mobile terminal 11, but this description is nonlimiting. The method described above may also be implemented in the same way using a fixed terminal, such as a desktop computer. This fixed terminal may comprise a communicating means, which may or may not be integrated, in order, for example, to allow it to consult one or more databases located on one or more remote servers 12, 12'. To provide the position data of the predefined site, the user must enter them manually. Likewise, to define the shadow mask, the user must upload an image taken at the predefined site, optionally with a certain field-of-view angle. The various data, such as the position data and the image intended to define the shadow mask, are stored in a memory of the fixed terminal. In this configuration, the program implementing the testing method may be downloaded, for example via the Internet, onto the computer, or may be located on a data medium, such as a magnetic data medium or a medium containing a memory.

According to another mode of implementation, the user may connect, using his fixed or mobile terminal, to a remote server 12, 12', comprising at least one memory 121 on which the computer program that implements the testing method is stored.

Another subject of the present invention is a computer-program product containing instructions that are readable by a computer or any other equivalent computational device, such as a fixed or mobile terminal, and that, when they are executed by a processor, cause the processor to execute the method for testing compatibility, such as described above. According to one embodiment, the computer-program product is downloadable from a communication network and/or stored on a computer-readable and/or computer-executable data medium.

Another subject of the present invention is a storage medium that is readable by a processor, for example a computer or any type of equivalent computational device, and on which a computer program comprising instructions for executing the steps of the method for testing compatibility, such as described above, is stored.

Another subject of the invention is a signal of a data medium, carrying the computer-program product such as defined above. The various modes of implementation and variants defined above may be combined to generate new embodiments of the invention.

The invention claimed is:

1. A method for testing compatibility between energy requirements of an electrically stand-alone home-automation device and a plurality of positions on a predefined site for installing a photovoltaic module, the electrically stand-alone home-automation device comprising the photovoltaic module, a device that closes, occults, protects or screens from the sun, and an element for storing electrical energy that is configured to supply the device that closes, occults, protects or screens from the sun with power, the element for storing electrical energy being connected to the photovoltaic module and intended to be charged by electrical energy generated by the photovoltaic module, the method being performed on a mobile terminal, the method comprising:
  selecting the electrically stand-alone home-automation device,
  obtaining, from a server remote from the mobile terminal, and storing, in a first memory of the mobile terminal, data identifying technical characteristics of the selected electrically stand-alone home-automation device,
  obtaining and storing, in a second memory of the mobile terminal, first position data relating to a first position on the predefined site, the first position having a first location and a first orientation and/or first inclination on the predefined site, wherein the first position data comprise at least first data on the first location and on the first orientation and/or first inclination on the predefined site,
  obtaining and storing, in the second memory of the mobile terminal, second position data relating to the predefined site, the second position having a second location and a second orientation and/or second inclination on the predefined site, wherein the second position data comprise at least second data on the second location and on the second orientation and/or second inclination on the predefined site,
wherein at least one of (i) the second orientation is different from the first orientation, or (ii) the second inclination is different from the first inclination,
wherein the first data on the first orientation and/or first inclination and the second data on the second orientation and/or second inclination are provided by an orientation and/or inclination device of the mobile terminal respectively positioned on the predefined site or with a respective orientation and/or inclination as on the predefined site,
  estimating and storing, in a third memory of the mobile terminal, data of a sun chart at the predefined site,
  for the first position data, computing an estimation of a variation in an amplitude of solar radiation received at the first position on the predefined site over a year while taking into account a position of the predefined site and a shadow mask,
  for the second position data, computing an estimation of a variation in an amplitude of solar radiation received at the second position on the predefined site over a year while taking into account the position of the predefined site and a shadow mask,
  computing a first energy balance on the basis of the variation in the amplitude of the solar radiation received at the first position on the predefined site and of the energy requirements of the selected electrically stand-alone home-automation device,
  computing a second energy balance on the basis of the variation in the amplitude of the solar radiation received at the second position on the predefined site and of the energy requirements of the selected electrically stand-alone home-automation device,
  estimating a first confidence index representative of a compatibility between the energy requirements of the selected electrically stand-alone home-automation device and the energy delivered by the photovoltaic module at the first position on the predefined site, and
  estimating a second confidence index representative of a compatibility between the energy requirements of the selected electrically stand-alone home-automation device and the energy delivered by the photovoltaic module at the second position on the predefined site,
wherein the estimating of each of the respective first and second confidence indices comprises computing a number of successive operating cycles that may be carried out by the selected electrically stand-alone home-automation device when a value of a charge of the element for storing electrical energy is equal to a yearly threshold value, and
wherein the device that closes, occults, protects or screens from the sun comprises an actuator and a movable element that closes, occults, protects or screens from the sun, wherein the movable element is movable between a completely open position and a completely closed position, and an operating cycle is a movement that brings the movable element from the completely closed position to the completely open position or from the completely open position to the completely closed position.

2. The method as claimed in claim 1, further comprising defining and storing, in a fourth memory, data of a shadow mask representative of elements likely to project a shadow onto the predefined site.

3. The method as claimed in claim 2, comprising taking one or more photographs and/or recording a film, at the predefined site, according to an image-capture angle, wherein the shadow mask is defined on the basis of the one or more photographs taken at the predefined site and/or on the basis of the film recorded at the predefined site.

4. The method as claimed in claim 3, wherein the defining and storing of the data of the shadow mask representative of the elements likely to project a shadow onto the predefined site comprises optimizing a value of the image-capture angle with respect to a normal to a sensitive surface of the photovoltaic module placed at the predefined site to maximize intersections between a zone covered by the image and a path of the sun.

5. The method as claimed in claim 4, wherein the value of the image-capture angle is optimized by considering three criteria, a first criterion dependent on an angle of incidence of the sun, a second criterion dependent on a response of the photovoltaic module and a third criterion dependent on a duration of insolation at the predefined site.

6. The method as claimed in claim 1, wherein the estimating of the respective confidence index comprises computing a daily number of operating cycles of the electrically stand-alone home-automation device.

7. The method as claimed in claim 6, wherein the daily number of operating cycles of the electrically stand-alone home-automation device is computed iteratively.

8. The method as claimed in claim 1, wherein the estimating of the respective confidence index comprises computing a number of typical daily use scenarios that the electrically stand-alone home-automation device is able to handle when a value of a charge of the element for storing electrical energy is equal to a yearly threshold value.

9. The method as claimed in claim 1, wherein the computing of the estimation of the variation in the amplitude of the solar radiation comprises:
estimating average insolation data at the predefined site, and
superposing the average insolation data with those of the shadow mask.

10. The method as claimed in claim 1, wherein the computing of the respective energy balance comprises computing the energy balance over a complete year.

11. A method for installing an electrically stand-alone home-automation device, the electrically stand-alone home-automation device comprising a photovoltaic module, a device that closes, occults, protects or screens from the sun and an element for storing electrical energy that is configured to supply the device that closes, occults, protects or screens from the sun with power, the element for storing electrical energy being connected to the photovoltaic module and intended to be charged by the electrical energy generated by the photovoltaic module,
the method comprising:
implementing the method for testing compatibility between the energy requirements of the electrically stand-alone home-automation device and the plurality of positions on the predefined site for installing the photovoltaic module as claimed in claim 1, and, if the compatibility test is positive for at least one among the plurality of positions on the predefined site,
installing the device that closes, occults, protects or screens from the sun of the electrically stand-alone home-automation device, and
installing the photovoltaic module of the electrically stand-alone home-automation device in one of the at least one position on the predefined site for which the compatibility test is positive.

12. The method as claimed in claim 1, wherein the estimation of the respective confidence index comprises comparing a charge of the element for storing electrical energy, a discharge of the element for storing electrical energy, and a consumption of the device that closes, occults, protects or screens from the sun, so as to determine a compatibility between the energy requirements of the device that closes, occults, protects or screens from the sun and the predefined site intended to receive the photovoltaic module associated with the device that closes, occults, protects or screens from the sun.

13. The method as claimed in claim 1, wherein the yearly threshold value is the lowest value of the charge of the energy storing element over a year.

14. The method as claimed in claim 1, wherein the mobile terminal is separate from the selected electrically stand-alone home-automation device.

15. The method as claimed in claim 1, wherein, the selecting of the respective home-automation devices is performed by respectively choosing from a list of a plurality of home-automation devices, by entry of respective identifying data of the home-automation devices via a human-machine interface, or by digitization of respective barcodes identifying the home-automation devices.

16. A mobile computational device for testing compatibility, comprising hardware and/or software elements designed to implement a compatibility method for testing compatibility between energy requirements of an electrically stand-alone home-automation device and a plurality of positions on a predefined site, the electrically stand-alone home-automation device comprising a photovoltaic module intended to be installed at the predefined site, a device that closes, occults, protects or screens from the sun, and an element for storing electrical energy that is configured to supply the device that closes, occults, protects or screens from the sun with power, the element for storing electrical energy being connected to the photovoltaic module and intended to be charged by electrical energy generated by the photovoltaic module,
the method comprising:
selecting the electrically stand-alone home-automation device,
obtaining, from a server remote from the mobile computational device, and storing, in a first memory of the mobile computational device, data identifying technical characteristics of the selected electrically stand-alone home-automation device,
obtaining and storing, in a second memory of the mobile computational device, first position data relating to a first position on the predefined site, the first position having a first location and a first orientation and/or first inclination on the predefined site, wherein the first position data comprise at least data on the first location and on the first orientation and/or first inclination on the predefined site,
obtaining and storing, in the second memory of the mobile computational device, second position data relating to the predefined site, the second position having a second location and a second orientation and/or second inclination on the predefined site, wherein the second position data comprise at least second data on a second location and on a second orientation and/or second inclination on the predefined site,
wherein at least one of (i) the second orientation is different from the first orientation, or (ii) the second inclination is different from the first inclination,
wherein the first data on the first orientation and/or first inclination and the second data on the second orientation and/or second inclination are provided by an orientation and/or inclination device of the mobile computational device respectively positioned on the predefined site or with a respective orientation and/or inclination as on the predefined site,
estimating and storing, in a third memory of the mobile computational device, data of a sun chart at the predefined site,
for the first position data, computing an estimation of a variation in an amplitude of solar radiation received at the first position on the predefined site over a year while taking into account a position of the predefined site and a shadow mask,
for the second position data, computing an estimation of a variation in an amplitude of solar radiation received at the second position on the predefined site over a year while taking into account the position of the predefined site and a shadow mask,
computing a first energy balance on the basis of the variation in the amplitude of the solar radiation received at the first position on the predefined site and of the energy requirements of the selected electrically stand-alone home-automation device, computing a second energy balance on the basis of the variation in the amplitude of the solar radiation received at the second position on the predefined site and of the energy requirements of the selected electrically stand-alone home-automation device, estimating a first confidence index representative of a compatibility between the energy requirements of the selected electrically stand-alone home-automation device and the energy delivered by the photovoltaic module at the first position on the predefined site, and estimating a second confidence index representative of a compatibility between the energy requirements of the selected electrically stand-alone home-automation device and the energy delivered by the photovoltaic module at the second position on the predefined site, wherein the estimating of each of the respective first and second confidence indices comprises computing a number of successive operating cycles that may be carried out by the selected electrically stand-alone home-automation device when a value of a charge of the element for storing electrical energy is equal to a yearly threshold value, and wherein the device that closes, occults, protects or screens from the sun comprises an actuator and a movable element that closes, occults, protects or screens from the sun, wherein the movable element is movable between a completely open position and a completely closed position, and an operating cycle is a movement that brings the movable element from the completely closed position to the completely open position or from the completely open position to the completely closed position.

17. The device for testing compatibility as claimed in claim 16, wherein the yearly threshold value is the lowest value of the charge of the energy storing element over a year.

18. The mobile computational device as claimed in claim 16, wherein the mobile computational device is separate from the selected electrically stand-alone home-automation device.

19. A method for testing compatibility between energy requirements of a plurality of electrically stand-alone home-automation devices and a predefined site for installing a photovoltaic module, the electrically stand-alone home-automation device comprising the photovoltaic module, a device that closes, occults, protects or screens from the sun, and an element for storing electrical energy that is configured to supply the device that closes, occults, protects or screens from the sun with power, the element for storing electrical energy being connected to the photovoltaic module and intended to be charged by electrical energy generated by the photovoltaic module, the method being performed on a mobile computational device and comprising:

selecting a first electrically stand-alone home-automation device from a list comprising a plurality of home-automation devices, and storing, in a first memory of the mobile computational device, first data identifying technical characteristics of the selected first electrically stand-alone home-automation device, selecting a second electrically stand-alone home-automation device from the list comprising the plurality of home-automation devices, and storing, in the first memory of the mobile computational device, second data identifying technical characteristics of the selected second electrically stand-alone home-automation device, obtaining and storing, in a second memory of the mobile computational device, position data relating to the predefined site, estimating and storing, in a third memory of the mobile computational device, data of a sun chart at the predefined site, computing an estimation of a variation in an amplitude of solar radiation received at the predefined site over a year while taking into account the position of the predefined site and a shadow mask, computing a first energy balance on the basis of the variation in the amplitude of the solar radiation received at the predefined site and of the energy requirements of the selected first electrically stand-alone home-automation device, computing a second energy balance on the basis of the variation in the amplitude of the solar radiation received at the predefined site and of the energy requirements of the selected second electrically stand-alone home-automation device, estimating a first confidence index representative of a compatibility between the energy requirements of the selected first electrically stand-alone home-automation device and the energy delivered by the photovoltaic module, and estimating a second confidence index representative of a compatibility between the energy requirements of the selected second electrically stand-alone home-automation device and the energy delivered by the photovoltaic module, wherein the estimating of each of the respective first and second confidence indices comprises computing a number of successive operating cycles that may be carried out by the respective selected electrically stand-alone home-automation device when a value of a charge of the element for storing electrical energy is equal to a yearly threshold value, and wherein the respective device that closes, occults, protects or screens from the sun comprises an actuator and a movable element that closes, occults, protects or screens from the sun, wherein the movable element is movable between a completely open position and a completely closed position, and an operating cycle is a movement that brings the movable element from the completely closed position to the completely open position or from the completely open position to the completely closed position.

20. The method as claimed in claim 19, wherein the list comprising the plurality of the electrically stand-alone home-automation devices is stored in a memory of the mobile computational device.

21. The method as claimed in claim 20, comprising obtaining, from a server remote from the mobile computational device, the first and second data identifying technical characteristics of the selected first and second electrically stand-alone home-automation devices.

22. The method as claimed in claim 19, wherein the list of the electrically stand-alone home-automation devices is stored in a memory of a server remote from the mobile computation device.

23. The method as claimed in claim 22, comprising obtaining, from the server remote from the mobile computational device, the first and second data identifying technical characteristics of the selected first and second electrically stand-alone home-automation devices.

\* \* \* \* \*